(12) United States Patent
Hatambeiki et al.

(10) Patent No.: US 11,776,539 B2
(45) Date of Patent: Oct. 3, 2023

(54) VOICE ASSISTANT WITH SOUND METERING CAPABILITIES

(71) Applicant: Universal Electronics Inc., Santa Ana, CA (US)

(72) Inventors: Arsham Hatambeiki, San Francisco, CA (US); Haiming Huang, Santa Ana, CA (US); Nicu Ahmadi, Santa Ana, CA (US); Allen Yuh, Diamond Bar, CA (US); Jason Chen, Santa Ana, CA (US); Christopher Chambers, Stanton, CA (US); Maryam Owrang, Santa Ana, CA (US)

(73) Assignee: Universal Electronics Inc., Santa Ana, CA (US)

( * ) Notice: Subject to any disclaimer, the term of this patent is extended or adjusted under 35 U.S.C. 154(b) by 323 days.

(21) Appl. No.: 16/731,270

(22) Filed: Dec. 31, 2019

(65) Prior Publication Data

US 2020/0219505 A1 Jul. 9, 2020

Related U.S. Application Data

(63) Continuation-in-part of application No. 16/717,546, filed on Dec. 17, 2019, now Pat. No. 11,451,618.

(60) Provisional application No. 62/789,857, filed on Jan. 8, 2019.

(51) Int. Cl.
*G06F 9/445* (2018.01)
*G10L 15/22* (2006.01)
*G10L 25/51* (2013.01)

(52) U.S. Cl.
CPC .............. *G10L 15/22* (2013.01); *G10L 25/51* (2013.01); *G10L 2015/223* (2013.01)

(58) Field of Classification Search
CPC ........................................................ G10L 15/22
USPC ........................................................ 717/177
See application file for complete search history.

(56) References Cited

U.S. PATENT DOCUMENTS

| 6,515,996 | B1 | 2/2003 | Tonnby et al. |
| 7,143,214 | B2 | 11/2006 | Hayes et al. |
| 7,266,777 | B2 | 9/2007 | Scott et al. |
| 8,243,207 | B2 | 8/2012 | Arling et al. |

(Continued)

FOREIGN PATENT DOCUMENTS

| EP | 1564972 A1 | 8/2005 |
| EP | 1755242 A2 | 2/2007 |

(Continued)

OTHER PUBLICATIONS

Israel Patent Office, Office Action issued on Israel patent application No. 248593, received May 6, 2020, 5 pages.

(Continued)

*Primary Examiner* — Evral E Bodden
(74) *Attorney, Agent, or Firm* — Greenberg Traurig, LLP

(57) ABSTRACT

Described are systems and methods for enabling voice interaction with appliances, services (e.g., media streaming services, gaming services, news feed services, social platform services, etc.), and the like by way of appropriate supplied apps (also referred to as "skills," "actions," or the like) which may be presented or downloaded to a smart device having associated therewith one or more cloud-based voice service platforms. Also described are systems that utilize one or more microphones to provide sound metering for control purposes.

17 Claims, 29 Drawing Sheets

(56) References Cited

U.S. PATENT DOCUMENTS

| | | | |
|---|---|---|---|
| 8,606,889 | B2 | 12/2013 | Kazan et al. |
| 8,812,629 | B2 | 8/2014 | Arling et al. |
| 8,898,759 | B2 | 11/2014 | Schultz et al. |
| 9,554,061 | B1 | 1/2017 | Proctor, Jr. |
| 10,074,364 | B1 | 9/2018 | Wightman et al. |
| 10,264,547 | B1 | 4/2019 | Zhong et al. |
| 10,397,749 | B1 | 8/2019 | Barua et al. |
| 2001/0049718 | A1 | 12/2001 | Ozawa |
| 2003/0156053 | A1 | 8/2003 | Wall et al. |
| 2004/0010327 | A1 | 1/2004 | Terashima et al. |
| 2005/0076153 | A1 | 4/2005 | Nedellec |
| 2005/0138179 | A1 | 6/2005 | Encarnacion et al. |
| 2005/0154787 | A1 | 7/2005 | Cochran et al. |
| 2005/0159823 | A1 | 7/2005 | Hayes et al. |
| 2005/0166136 | A1 | 7/2005 | Capps et al. |
| 2005/0221792 | A1 | 10/2005 | Mattisson |
| 2006/0028337 | A1 | 2/2006 | Li |
| 2006/0075398 | A1 | 4/2006 | Bennett et al. |
| 2006/0271925 | A1 | 11/2006 | Schuelein et al. |
| 2006/0293898 | A1* | 12/2006 | Ollason ............ G10L 17/00 704/273 |
| 2007/0118499 | A1 | 5/2007 | Hwang et al. |
| 2007/0156842 | A1 | 7/2007 | Vermeulen et al. |
| 2007/0229465 | A1 | 10/2007 | Sakai et al. |
| 2008/0300967 | A1 | 12/2008 | Buckley et al. |
| 2009/0163779 | A1* | 6/2009 | Dean ............ G06F 16/683 600/301 |
| 2009/0239587 | A1 | 9/2009 | Negron et al. |
| 2010/0082176 | A1 | 4/2010 | Chang |
| 2010/0134317 | A1 | 6/2010 | Breuil et al. |
| 2011/0137742 | A1 | 6/2011 | Parikh |
| 2011/0138277 | A1 | 6/2011 | Scott et al. |
| 2011/0179149 | A1 | 7/2011 | Kazan et al. |
| 2011/0289113 | A1 | 11/2011 | Arling et al. |
| 2012/0086563 | A1 | 4/2012 | Arling et al. |
| 2012/0210268 | A1 | 8/2012 | Hilbrink et al. |
| 2012/0250627 | A1 | 10/2012 | McCormack et al. |
| 2012/0260212 | A1 | 10/2012 | Young et al. |
| 2012/0263155 | A1 | 10/2012 | Kholaif et al. |
| 2013/0041959 | A1 | 2/2013 | Bengtsson |
| 2013/0070153 | A1 | 3/2013 | Hill et al. |
| 2013/0074062 | A1 | 3/2013 | Arnold et al. |
| 2013/0241714 | A1 | 9/2013 | Nakano et al. |
| 2014/0095692 | A1 | 4/2014 | Anderson et al. |
| 2014/0111318 | A1 | 4/2014 | Arling |
| 2014/0176309 | A1 | 6/2014 | Wang et al. |
| 2014/0218620 | A1 | 8/2014 | Griffin et al. |
| 2014/0222436 | A1 | 8/2014 | Binder et al. |
| 2014/0223423 | A1 | 8/2014 | Alsina et al. |
| 2014/0359595 | A1 | 12/2014 | Sehgal et al. |
| 2015/0063575 | A1* | 3/2015 | Tan ............ G06F 16/683 381/56 |
| 2015/0154002 | A1 | 6/2015 | Weinstein et al. |
| 2015/0227356 | A1 | 8/2015 | Byrnes et al. |
| 2015/0304703 | A1 | 10/2015 | Liu et al. |
| 2016/0125733 | A1 | 5/2016 | Sallas et al. |
| 2017/0026763 | A1* | 1/2017 | Pratt ............ H04N 5/23296 |
| 2017/0111351 | A1 | 4/2017 | Grajek et al. |
| 2017/0205783 | A1 | 7/2017 | Tannenbaum et al. |
| 2018/0115848 | A1 | 4/2018 | Kitazawa |
| 2018/0130469 | A1 | 5/2018 | Gruenstein et al. |
| 2018/0152557 | A1 | 5/2018 | White et al. |
| 2018/0196683 | A1 | 7/2018 | Radebaugh et al. |
| 2018/0261223 | A1 | 9/2018 | Jain et al. |
| 2018/0308477 | A1* | 10/2018 | Nagasaka ............ H04Q 9/00 |
| 2019/0033446 | A1 | 1/2019 | Bultan et al. |
| 2019/0049989 | A1 | 2/2019 | Akotkar et al. |
| 2019/0287525 | A1 | 9/2019 | Kim et al. |
| 2020/0204613 | A1 | 6/2020 | Hatambeiki et al. |
| 2020/0219499 | A1* | 7/2020 | Kwatra ............ G06F 3/167 |
| 2021/0120301 | A1 | 4/2021 | Xu et al. |
| 2021/0368562 | A1 | 11/2021 | Hatambeiki et al. |
| 2022/0109669 | A1 | 4/2022 | Yuh et al. |
| 2022/0294639 | A1 | 9/2022 | Amsalem et al. |

FOREIGN PATENT DOCUMENTS

| | | |
|---|---|---|
| WO | 2006118047 A1 | 11/2006 |
| WO | 2013032332 A1 | 3/2013 |
| WO | 2013044344 A1 | 4/2013 |
| WO | 2015/095637 A1 | 6/2015 |
| WO | 2018170504 A1 | 9/2018 |
| WO | 2018198036 A1 | 11/2018 |
| WO | 2018/224812 A1 | 12/2018 |
| WO | 2020172134 A1 | 8/2020 |
| WO | 2020232336 A1 | 11/2020 |

OTHER PUBLICATIONS

European Patent Office, Examination Report issued on European patent application No. 15792162.8, dated May 25, 2020, 10 pages.
U.S. Patent and Trademark Office, Non-Final Office Action issued in U.S. Appl. No. 16/216,554, dated Apr. 20, 2020, 18 pgs.
ISA/US, Int. Search Report and Written Opinion issued on PCT application No. US19/67034, dated Mar. 9, 2020, 11 pages.
U.S. Patent and Trademark Office, Non-Final Office Action issued in U.S. Appl. No. 16/382,796, dated Jun. 9, 2020, 7 pgs.
CNIPA, Office Action issued on Chinese patent application No. 201580002352.3, received Jun. 4, 2020, 5 pages.
ISA/US, International Preliminary Report on Patentability issued on PCT application No. US15/30255, dated Nov. 24, 2016, 6 pgs.
European Patent Office, extended search report issued on European patent application No. 15792162.8, received May 12, 2017, 11 pgs.
ISA/US, International Search Report and Written Opinion issued on PCT application No. PCT/US20/67326, dated Feb. 5, 2021, 12 pages.
ISA/US, Int. Search Report and Written Opinion issued on PCT application No. US20/67605, dated Mar. 10, 2021, 9 pages.
ISA/US, Int. Search Report and Written Opinion issued on PCT application No. PCT/US21/21923, dated May 25, 2021, 13 pages.
EPO, extended European search report issued on European patent application No. 20910756.4, dated Dec. 20, 2022, 11 pages.
EPO, extended European Search Report issued on European patent application No. 19908998.8, dated Sep. 27, 2022, 10 pages.
Universal Electronics Inc., "Universal Electronics Teams Up with Sensory to Deliver Smart Home Digital Assistant Platform with Embedded Voice Control and Branded Assistant Experience" Jan. 4, 2019 (Jan. 4, 2019) Retrieved on Aug. 19, 2022 (Aug. 19, 2022) from <https://universalelectronicsinc.gcs-web.com/news-releases/news-release-details/universal-electronics-teams-sensory-deliver-smart-home-digital>.
ISA/US, Int. Search Report and Written Opinion issued on PCT application No. PCT/US22/33028, dated Oct. 14, 2022, 20 pages.
U.S. Patent and Trademark Office, Non-Final Office Action issued in U.S. Appl. No. 16/717,546, dated Dec. 13, 2021, 30 pgs.
U.S. Patent and Trademark Office, Non-Final Office Action issued in U.S. Appl. No. 17/673,145, filed Dec. 30, 2022, 6 pgs.
EPO, extended European Search Report issued on European patent application No. 21217138.3, dated Apr. 7, 2022, 12 pages.

* cited by examiner

| Function | Appliance | | | | | |
|---|---|---|---|---|---|---|
| | TV | AVR | STB/DVR | DVD | CD | Etc... |
| Power on | CEC | CEC | CEC | CEC | IR | --- |
| Power off | CEC | CEC | CEC | CEC | IR | --- |
| Volume up | IR | CEC | n/a | n/a | n/a | --- |
| Volume down | IR | CEC | n/a | n/a | n/a | --- |
| Mute | IR | CEC | n/a | n/a | n/a | --- |
| Play | n/a | n/a | CEC | CEC | IR | --- |
| Pause | n/a | n/a | CEC | CEC | IR | --- |
| FF | n/a | n/a | CEC | CEC | IR | --- |
| Rew | n/a | n/a | CEC | CEC | IR | --- |
| Sound field A | CEC | IP | IP | n/a | n/a | --- |
| Sound field B | CEC | IP | IP | n/a | n/a | --- |
| Input 1 | CEC | IR | n/a | n/a | n/a | --- |
| Input 2 | CEC | IR | n/a | n/a | n/a | --- |
| Etc... | | | | | | |

| | Activity = "Listen to music" | | | | |
| | Activity = "Watch a movie" | | | | |
| | Activity= "watch TV" | | | | |
| | Appliance | TV | STB/DVR | DVD | AVR |
| State | Power | On | On | On | On |
| | Input | HDMI1 | — | — | S/PDIF2 |
| Function | Volume | Off | — | — | Active |
| | Transport | — | Active | Off | — |

FIG. 12

| | Current appliance state | | | | |
| | Appliance | TV | STB/DVR | DVD | AVR |
| State | Power | On | Off | On | ?? |
| | Input | HDMI2 | — | — | ?? |

VOICE ASSISTANT WITH SOUND METERING CAPABILITIES

RELATED APPLICATION INFORMATION

The application claims the benefit of and is a continuation-in-part of U.S. application Ser. No. 16/717,546, filed on Dec. 17, 2019, which application claims the benefit of U.S. Provisional Application No. 62/789,857, filed on Jan. 8, 2019, the disclosures of which are incorporated herein by reference in their entirety.

BACKGROUND

Personal communication, productivity, and entertainment devices are known to include voice platforms, for example, the "ALEXA" cloud-based, voice service platform, the "SIRI" cloud-based, voice service platform, the "GOOGLE ASSISTANT" cloud-based, voice service platform, etc. Such voice service platforms generally function to convert spoken words to text using automatic speech recognition (ASR), to deduce the speaker's meaning using natural language understanding (NLU), and to provide the underlying customer intent to an app—also referred to as a "skill," "action," or the like. An app, once installed on a voice service enabled device, functions to give the voice service enabled device an ability to communicate with other devices, websites, services, and the like and, in some instances, functions to provide a user interface for interacting with a device, website, service, and the like. However, because devices, websites, services, and the like are generally configured to be operable with different ones of the various cloud-based, voice service platforms, it is seen that there is a challenge in getting devices to work together, for example, to provide true connectivity within a "connected home." The following disclosure is intended to address this problem among others.

SUMMARY

This following relates generally to systems and methods for enabling voice interaction with appliances, services (e.g., media streaming services, gaming services, news feed services, social platform services, etc.), and the like by way of appropriate supplied apps which may be presented or downloaded to a smart device having associated therewith one or more cloud-based, voice service platforms. For this purpose, an agent program resident in the smart device may periodically scan a local network environment (e.g., a wired and/or wireless network), listen for the utterance of keywords, and/or the like for the purpose of detecting the presence of one or more cloud-based voice service platforms, appliances, services, etc., either automatically or at user request. When the presence of such a cloud-based voice service platform, appliance, service, or the like is detected, the setup agent may initiate a download (and sometimes automatic installation) of an appropriate app for the detected cloud-based voice service platform, appliance, service, or the like, or, in those cases where a suitable app is found to be already included in the system, the setup agent may initiate any actions necessary to install or enable the app and, furthermore, may function to synchronize the app, after installation, with the detected cloud-based, voice service platform, appliance, or service. Such actions may include, for example, status download and update, transfer of user authentications, etc. The setup agent may also make use of a cloud based service or services to determine if an app is available for a newly detected appliance, service, or the like and, if necessary, to coordinate, authentication and synchronization of the app with the voice enabled platform and/or across all smart devices, devices, services, etc. that are currently present in an environment as desired.

A better understanding of the objects, advantages, features, properties and relationships of the subject systems and methods will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which:

FIG. 7 illustrates an exemplary preferred command matrix for use in a control environment, for example, as illustrated in FIG. 6;

FIG. 11 illustrates exemplary activity configuration matrices such as may be defined during the steps of FIG. 10;

FIG. 12 illustrates an exemplary current appliance state matrix which may be maintained by a data repository associated with a controlling device for use in determining the commands necessary to invoke one of the states defined by the matrix of FIG. 11;

DETAILED DESCRIPTION

Figure 1:
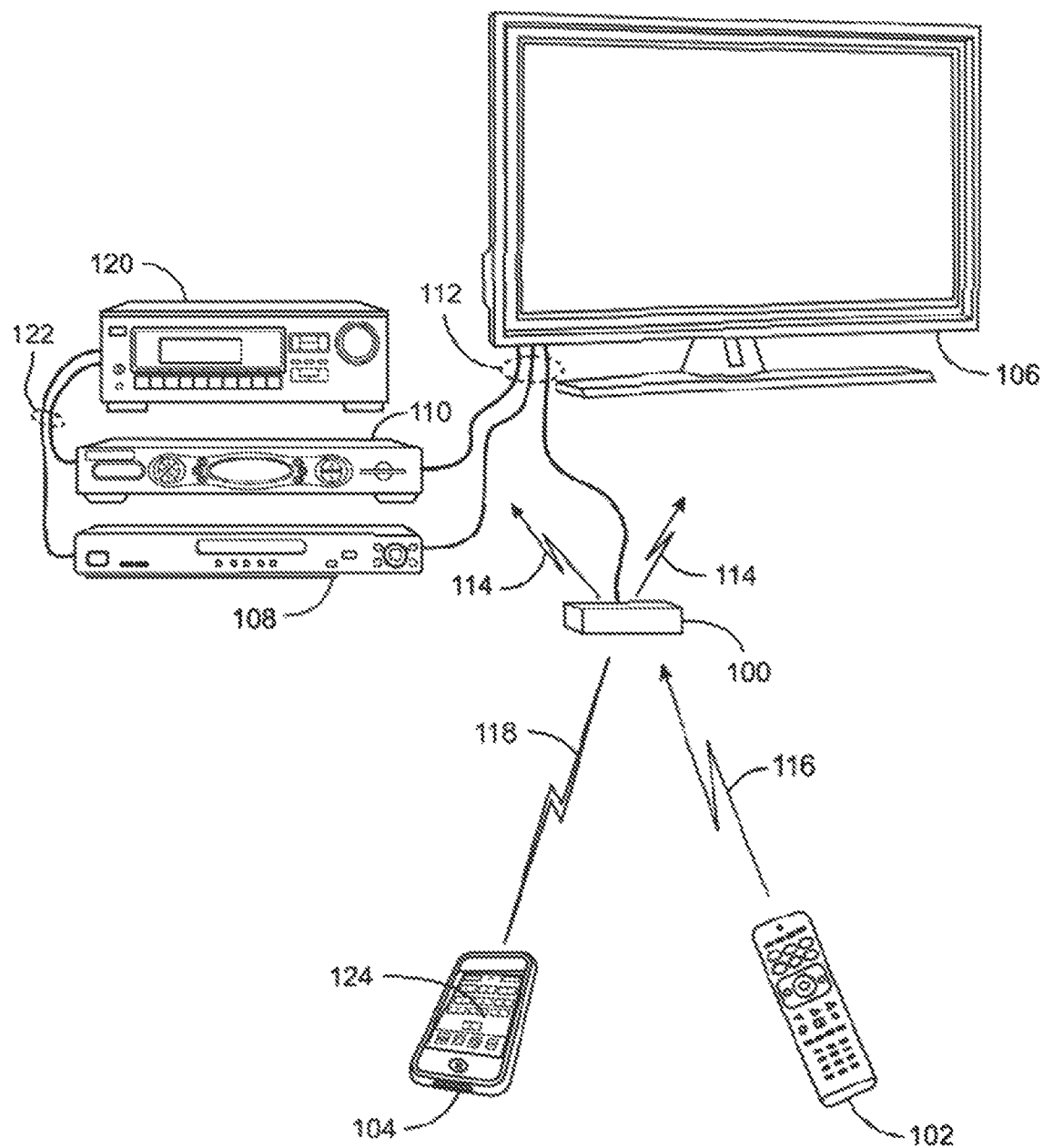
FIGS. 1 and 2 illustrate exemplary systems in which a standalone device may be utilized to control operation of several appliances.

With reference to FIG. 1, there is illustrated an exemplary system in which a device 100 (which is preferably capable of supporting one or more cloud-based, voice service platforms for the purpose of making the device 100 voice service enabled) may be used to at least issue commands to control various controllable appliances, such as a television 106, a cable set top box or Internet enabled streaming device (alone or combined with a digital video recorder) 110, a DVD player 108, and an AV receiver 120. While illustrated in the context of a television 106, STB/DVR 110, a DVD player 108, and an AV receiver 120, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. In this regard, it will be appreciated that such devices may have an associated app, also referred to herein as a "skill," "action," or the like, that functions to provide the cloud-based voice service platform enabled device 100 with an ability to communicate with these devices (and with other devices, websites, services, and the like as desired and/or required).

In the illustrative example of FIG. 1, appliance commands may be caused to be issued by device 100, when appropriately configured, in response to infrared ("IR") request signals 116 received from a remote control device 102, radio frequency ("RF") request signals 118 received from an app 124 resident on a smart device 104 or any other device from which device 100 may be adapted to receive requests, using any appropriate communication method. In addition, the device 100, when appropriately configured, will respond to voice communications received via use of, for example, one or more microphones provided to device 100. As illustrated, requested transmission of any commands from the device 100 to appliances 106,108,112,120 may take the form of wireless IR signals 114, CEC commands issued over a wired "HDMI" interface 112, RF signals such as contemplated by "RF4CE," "ZWAVE," and "BLUETOOTH," etc. as appropriate to the capabilities of the particular appliance to which each command may be directed. For example, in the system illustrated, AV receiver 120 may not support "HDMI" inputs, being connected to audio source appliances 108,110 via S/PDIF interfaces 122. Accordingly, device 100 may be constrained to transmit all commands destined for AV receiver 120 exclusively as IR signals, while commands destined for the other appliances 106 through 110 may take the form of either CEC, RF, or IR signals as appropriate for each command. By way of example without limitation, certain TV manufacturers may elect not to support volume adjustment via CEC. If the illustrative TV 106 is of such manufacture, device 100 may relay volume adjustment requests to TV 106 as IR signals 114, while other requests such as power on/off or input selections may be relayed in the form of CEC commands over "HDMI" connection 112.

It will, however, be appreciated that, while illustrated in the context of IR, RF, and wired CEC signal transmissions, in general, transmissions to and from device 100 may take the form of any convenient IR, RF, hardwired, point-to-point, or networked protocol, as necessary for a particular embodiment. Further, while wireless communications 116, 118, etc., between exemplary devices are illustrated herein as direct links, it should be appreciated that in some instances such communication may take place via a local area network or personal area network, and as such may involve various intermediary devices such as routers, bridges, access points, etc. Since these items are not necessary for an understanding of the instant invention, they are omitted from this and subsequent Figures for the sake of clarity.

Since smart device remote control apps such as that contemplated in the illustrative device 104 are well known, for the sake of brevity the operation, features, and functions thereof will not be described in detail herein. Nevertheless, if a more complete understanding of the nature of such apps is desired, the interested reader may turn to, for example, the before mentioned U.S. patent application Ser. No. 12/406, 601 or U.S. patent application Ser. No. 13/329,940, (now U.S. Pat. No. 8,243,207).

Figure 2:
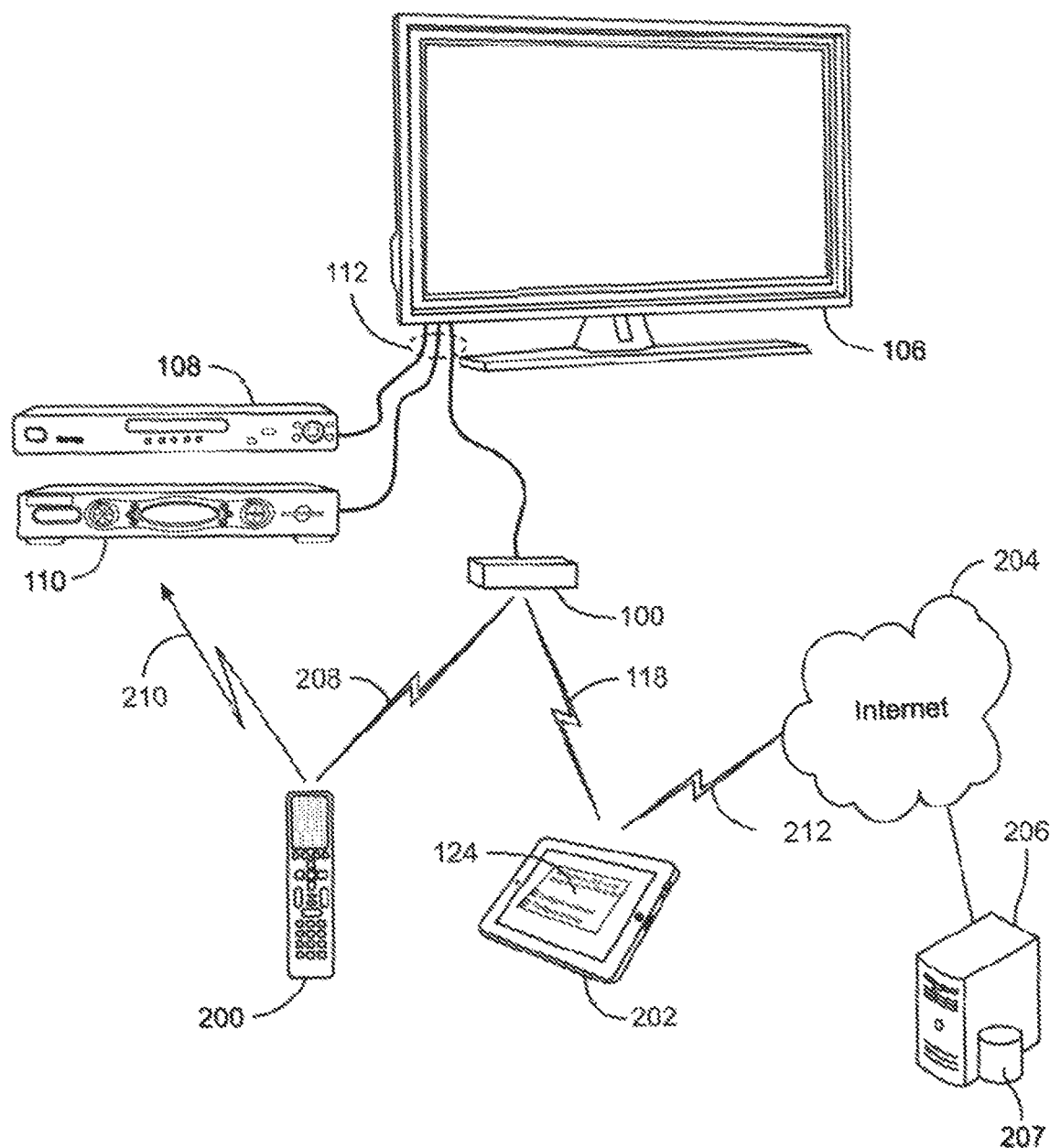

Turning now to FIG. 2, in a further illustrative embodiment, device 100 may receive wireless request signals from a remote control 200 and/or an app resident on a tablet computer 202. As before, command transmissions to appliances 106,108,110 may take the form of wired CEC commands or wireless RF or IR commands. However, in this example remote control 200 may be in bi-directional communication 208 with device 100 and accordingly the device 100 may delegate the transmission of certain commands, such as IR commands 210, to the remote control device 200 or to yet another device adapted to provide command signaling, e.g., use remote control 200 as a relay device for those commands determined to be best executed via IR transmissions. As also generally illustrated in FIG. 2, a setup app 214 executing on a smart device, such as tablet computer 202, may be utilized in conjunction with an Internet (212,204) accessible or cloud based server 206 and associated database 207 to initially configure device 100 for operation with the specific group of appliances to be controlled, e.g., to communicate to device 100 a matching command code set and capability profile for each particular appliance to be controlled, for example based on type, manufacture, model number, etc., as will be described in greater detail hereafter.

Figure 3:
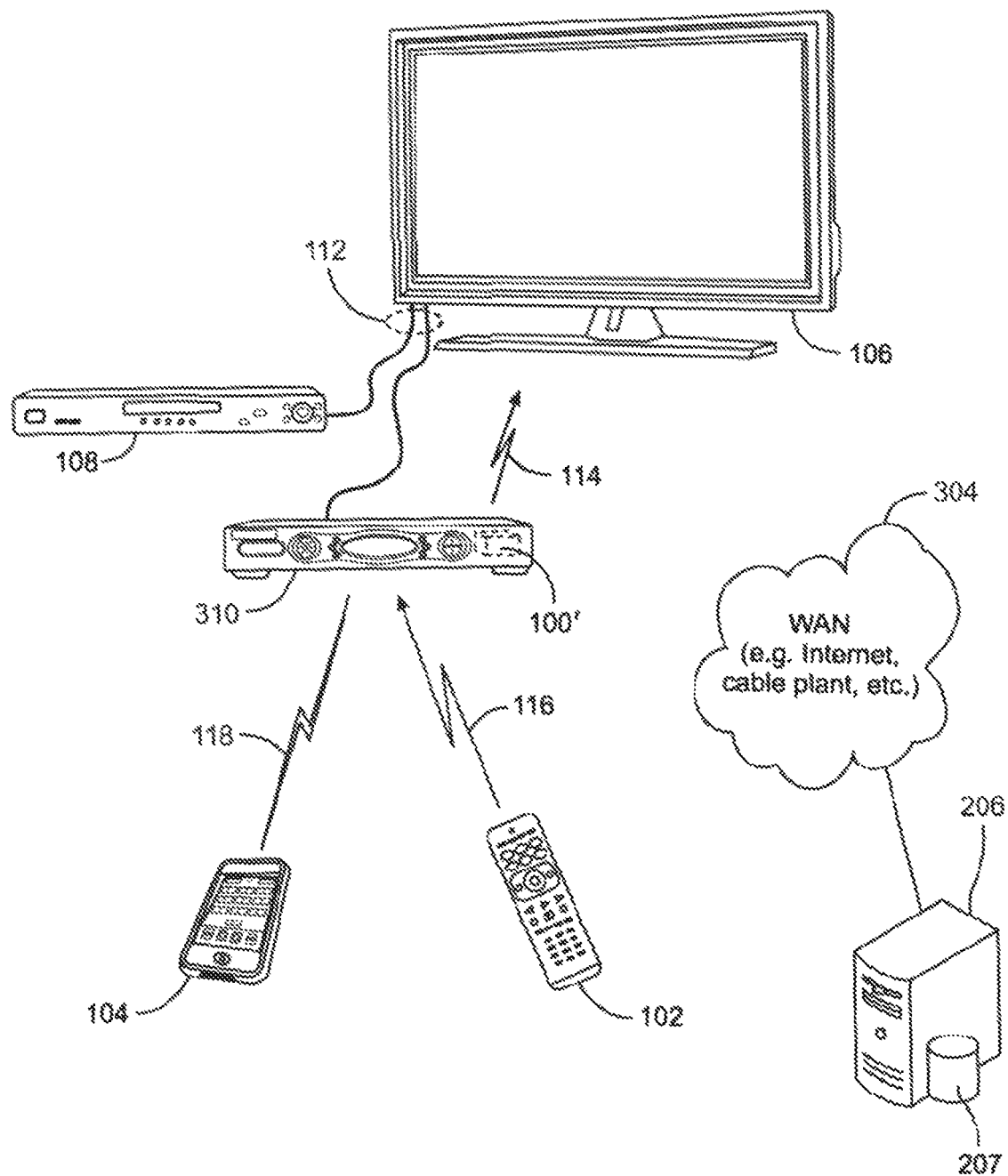
FIGS. 3 and 4 illustrate exemplary systems in which control functionality may be incorporated into an appliance which is part of a home entertainment system.

With reference to FIG. 3, in a further illustrative embodiment a device and/or module having control functionality 100' may be embedded in an appliance, for example STB/DVR 310. In this example, remote control 102 and/or smart device 104 may transmit wireless request signals directly to STB/DVR 310 for action by the built-in device 100', which actions may, as before, comprise CEC command transmissions via "HDMI" connection 112 or wireless RF or IR command transmissions 114, originating in this instance from an appropriate RF transmitter or IR blaster provisioned to the STB/DVR appliance 310. In this configuration, a set up application resident in STB/DVR 310 may be utilized to configure device 100', using for example an Internet connection 304 accessible through a cable modem and/or cable distribution system headend.

Figure 4:
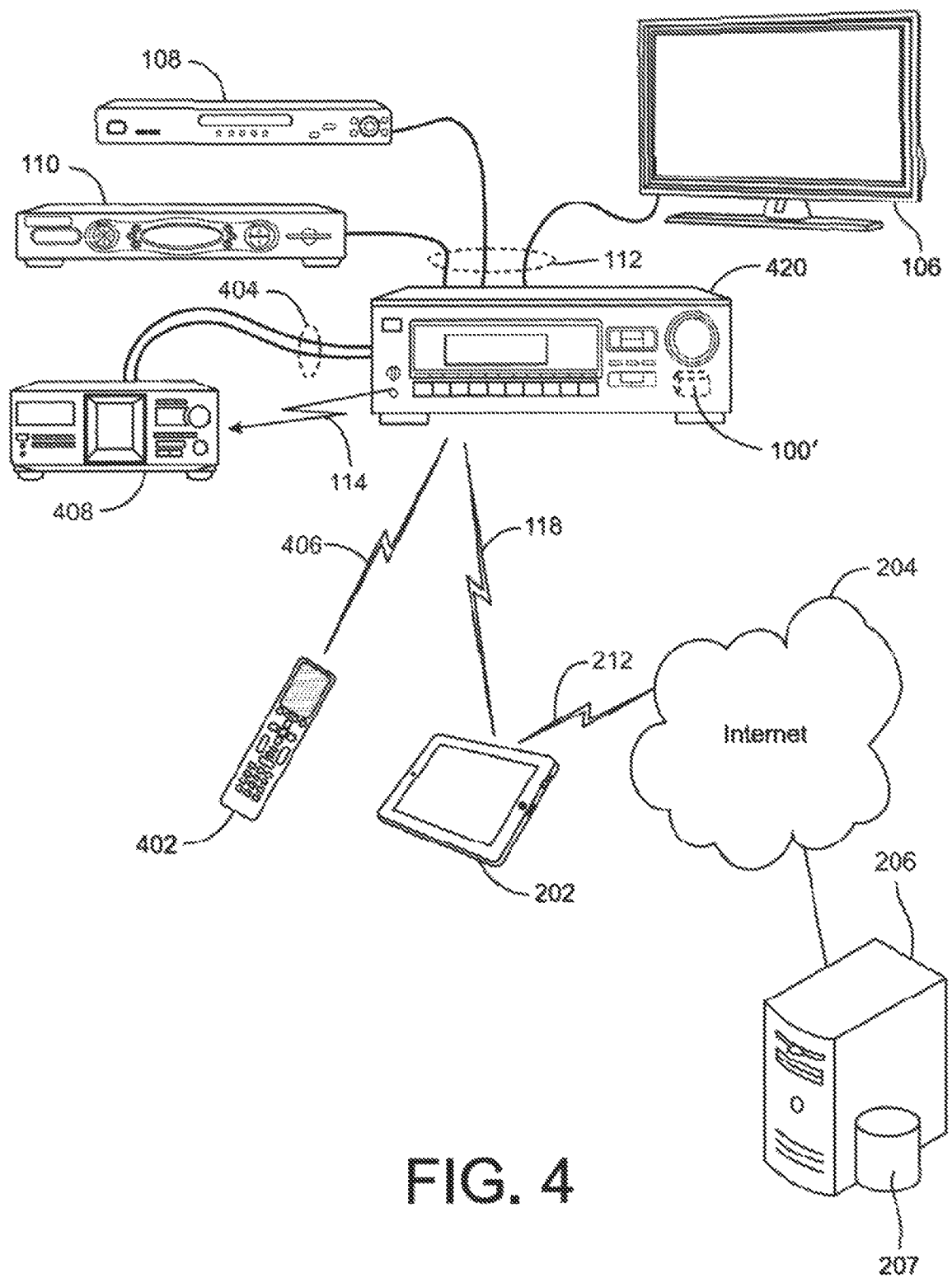

In the further illustrative embodiment of FIG. 4, a device having control functionality 100' may be embedded in an AV receiver 420 which may serve as an "HDMI" switch between various content sources such as a STB/DVR 110 or a DVD player 108 and a rendering device such as TV 106. In addition to "HDMI" inputs, AV receiver 420 may also support various other input formats, for example analog inputs such as the illustrative input 404 from CD player 408; composite or component video; S/PDIF coaxial or fiberoptic; etc. In this embodiment, request signals 406, voice commands, etc., may be directed to AV receiver 420, for example from remote control 402, for action by device 100'. As before, resulting appliance commands may be transmitted using CEC signals transmitted over "HDMI" connections 112, RF, or via IR signals 114 transmitted from an associated IR blaster. As appropriate for a particular embodiment, initial configuration of device 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying controlling device concept described herein, for example, device 100' may be incorporated into an Internet-capable TV, an "HDMI" switch, a game console, etc.; appliance command set and capability database 207 may be located at an internet cloud or a cable system headend, may be stored locally (in all or in part), which local storage may take the form of internal memory within the device 100' itself or in an appliance such as a TV, STB or AV receiver, or may take the form of a memory stick or the like attachable to a smart device or appliance; etc.

Figure 5:
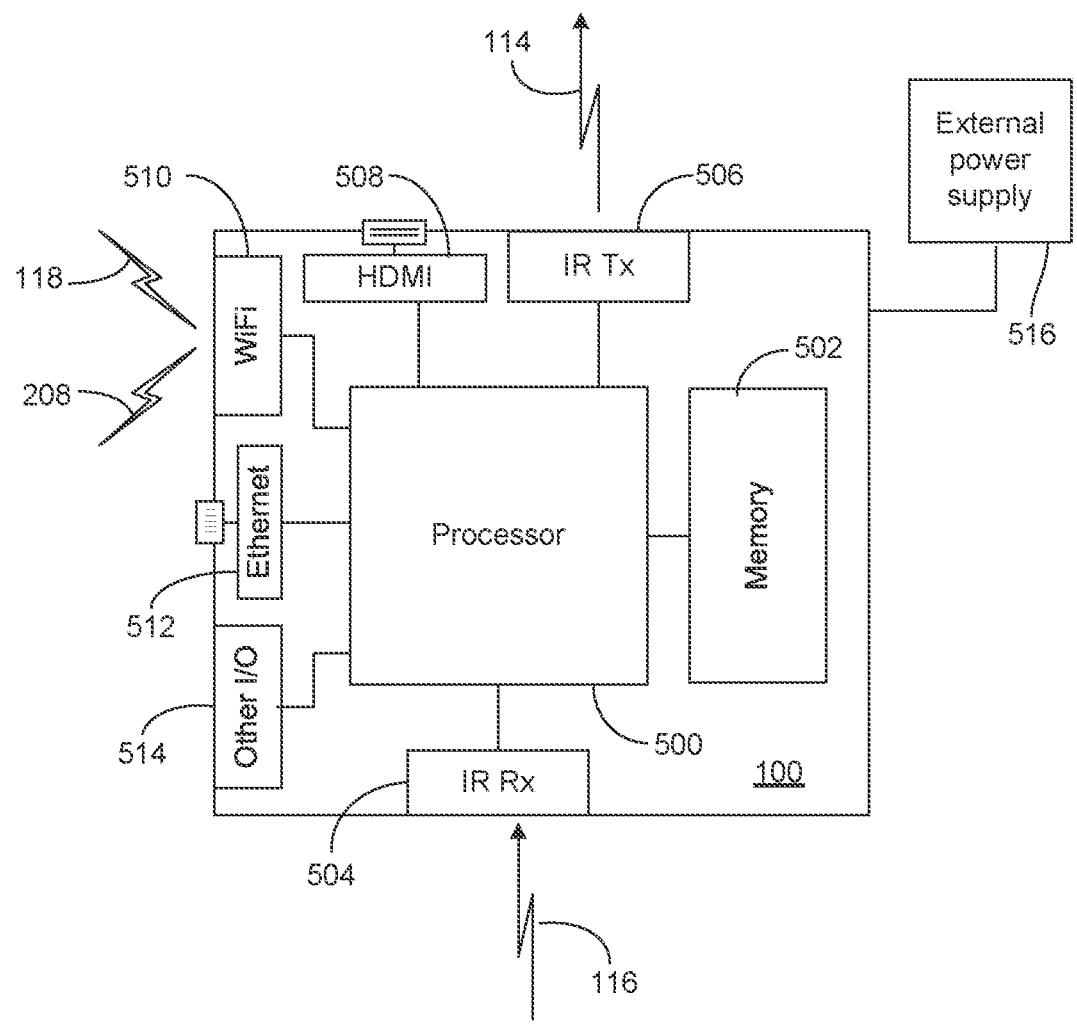
FIG. 5 illustrates a block diagram of an exemplary controlling device.

With reference to FIG. 5, an exemplary device 100 (whether stand alone or in an appliance supporting functionality embodied as a device 100') may include, as needed for a particular application, a processor 500 coupled to a memory 502 which memory may comprise a combination of ROM memory, RAM memory, and/or non-volatile read/write memory and may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the exemplary device 100 platform may include IR receiver circuitry 504 and IR transmitter circuitry 506; one or more microphones; an "HDMI" interface 508; one or more RF, e.g., WiFi, transceivers and interfaces 510; an Ethernet interface 512; and any other wired or wireless I/O interface(s) 514 as appropriate for a particular embodiment, by way of example without limitation "BLUETOOTH," "RF4CE," "USB," "ZIGBEE," "ZENSYS," "X10/INSTEON," "HOMEPLUG," "HOMEPNA," etc. In some instances, the electronic components comprising the exemplary device 100 platform may be powered by an external power source 516. In the case of a standalone device 100 such as illustrated in FIG. 1 or 2, this may comprise for example a compact AC adapter "wall wart," while integrated devices 100' such as illustrated in FIG. 3 or 4 may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

As will be understood by those skilled in the art, some or all of the memory 502 may include executable instructions that are intended to be executed by the processor 500 to control the operation of the device 100 (collectively, the device programming) as well as data which serves to define the necessary control protocols and command values for use in transmitting command signals to controllable appliances (collectively, the command data). In this manner, the processor 500 may be programmed to control the various electronic components within the exemplary device 100, e.g., to monitor the communication means 504,510 for incoming request messages from controlling devices, to monitor the microphones for sound signals, to cause the transmission of appliance command signals, etc.

To cause the device 100 to perform an action, the device 100 may be adapted to be responsive to events, such as a received voice signal, a received request message from remote control 102 or smart device 104, changes in connected appliance status reported over "HDMI" interface 508, "WIFI" interface 510, or "ETHERNET" interface 512, etc. In response to an event, appropriate instructions within the device programming may be executed. For example, when a command request is received via a microphone, from a smart phone 104, or the like, the device 100 may retrieve from the command data stored in memory 502 a preferred command transmission medium (e.g., IR, "RF4CE", CEC over "HDMI," IP over "WIFI,", etc.) and a corresponding command value and control protocol to be used in transmitting that command to an intended target appliance, e.g., TV 106, in a format recognizable by that appliance to thereby control one or more functional operations of that appliance. By way of further example, the status of connected appliances, e.g., powered or not powered, currently selected input, playing or paused, etc., as may be discerned from interfaces 508 through 514, may be monitored and/or tabulated by the device programming in order to facilitate adjustment of appliance settings to match user-defined activity profiles, e.g. "Watch TV", "View a movie", etc. It will also be appreciated that the command values, protocols to use, etc. may be obtained from a cloud-computing service as needed or as required.

Figure 6:
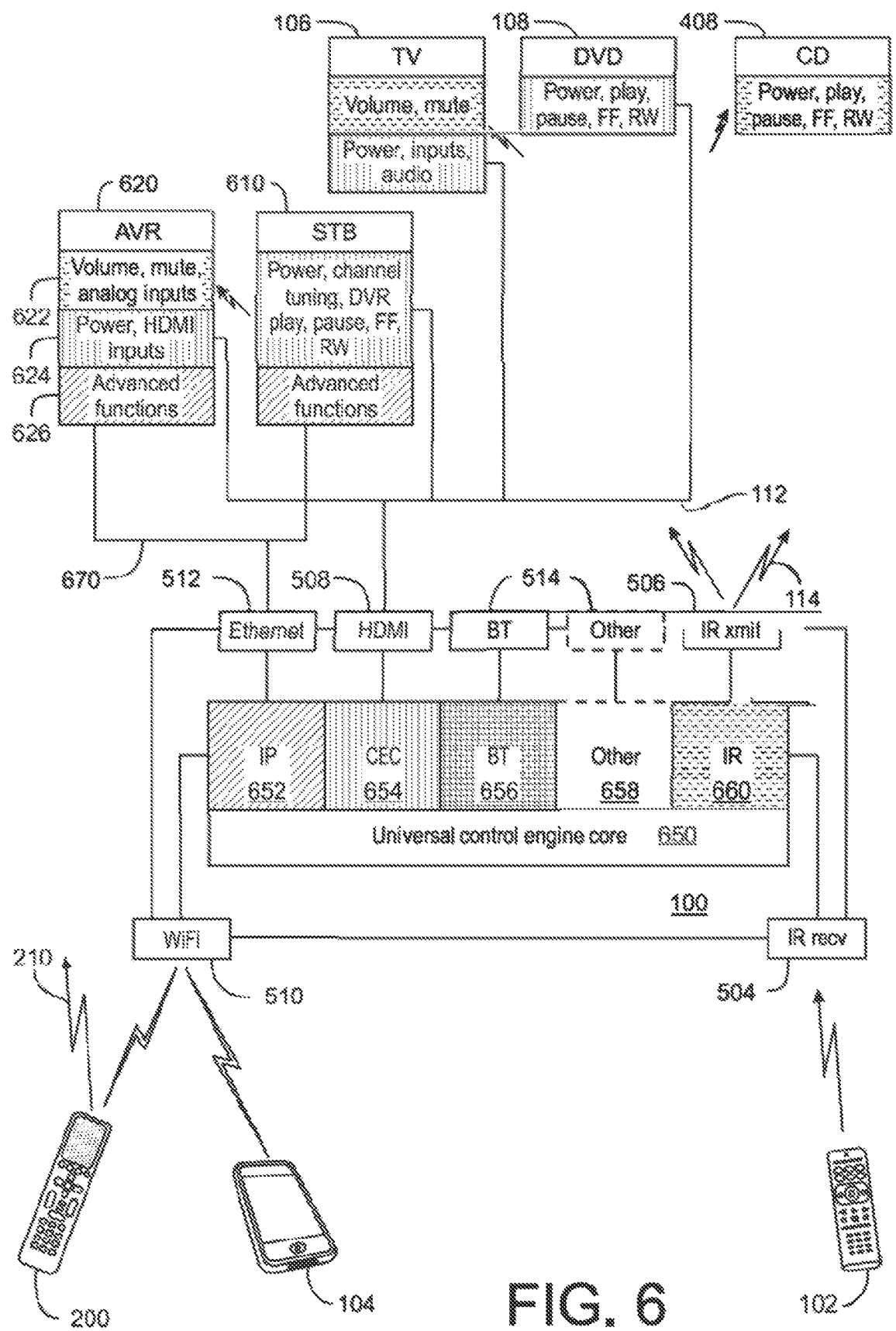
FIG. 6 illustrates a graphical representation of an exemplary control environment.

An overview of an exemplary control environment utilizing a device 100 is presented in FIG. 6. The programming of the exemplary device 100 may comprise a universal control engine core 650 together with a series of scalable software modules 652 through 660, including apps or "skills," each module supporting a particular appliance command protocol or method and provisioned as appropriate for a particular embodiment. By way of example, the illustrative embodiment of FIG. 6 may include an internet protocol (IP) module 652, a CEC over "HDMI" module 654, a "BLUETOOTH" module 656, an IR module 660, and other modules(s) 658, e.g., an RF module, as appropriate for the particular application. The appliances to be controlled may include an IP enabled AV receiver 620, an IP enabled STB/DVR 610, TV 106, DVD player 108, and CD player 408. As illustrated, certain of these devices may be interconnected via "HDMI" 112 and/or Ethernet 670 interfaces. (In this regard, it should be appreciated that the illustrative interconnections 112 and 670 of FIG. 6 are intended to depict logical topography only, and accordingly details of exact physical cabling structure and/or the presence of any necessary switches, routers, hubs, repeaters, interconnections, etc., are omitted for the sake of clarity.)

The preferred method/protocol/medium for issuance of commands to the exemplary appliances of FIG. 6 may vary by both appliance and by the function to be performed. By way of example, volume control and analog input selection commands 622 targeted to AV receiver 620 may be required to be issued via IR transmissions, while power on/off and "HDMI" input selection functionality commands 624 may be better communicated via CEC commands and advanced functionality commands 626 such as sound field configuration may be best communicated via an Ethernet connection. In a similar manner, the various operational functions of the other appliances may be best commanded via a mixture of mediums, methods, and protocols, as illustrated. As will be appreciated, in some instances a particular appliance may support receipt of an operational command via more than one path, for example the power on/off function of AV receiver 620 may be available not only as a CEC command, but also via an IR command. In such instances, the preferred command format may be that which has been determined to offer the greatest reliability, for example, in the above instance the CEC command may be preferred since this form of command is not dependent on line-of-sight and also permits confirmation that the action has been performed by the target appliance.

In order to determine the optimum method for each configured appliance type and command, the exemplary device core program 650 may be provisioned with a preferred command matrix 700, as illustrated in FIG. 7. Exemplary preferred command matrix 700 may comprise a series of data cells or elements, e.g. cells 712, each corresponding to a specific command 702 and a specific one of the appliances to be controlled 704. The data content of such a cell or element may comprise identification of a form of command/transmission to be used and a pointer to the required data value and formatting information for the specific command. By way of example, the data element 712 corresponding to the "Input 2" command 706 for the configured TV appliance 708, may comprise an indicator that a CEC command is to be used, i.e., an indicator of the transmission device that is to be used to communicate the command to the intended target appliance, together with a pointer to the appropriate command data value and HDMI-CEC bus address; while data element 714 corresponding to the same command function for the configured AV receiver 710 may comprise an indicator that an IR command is to be used, together with a pointer to appropriate command data and formatting information within an IR code library stored elsewhere in memory 502. In certain embodiments one or more secondary command matrices 716 may also be provisioned, allowing for the use of alternate command methods in the event it is determined by the device programming that a preferred command was unsuccessful. Command matrix 700 may also contain null entries, for example 718, where a particular function is not available on or not supported by a specific appliance. In an exemplary embodiment, command matrix 700 may be created and loaded into the memory 502 of the device 100 during an initialization and set-up process, as will now be described in further detail.

In order to perform initial configuration of device 100, a setup application may be provided. In some embodiments, such a set up application may take the form of programming to be executed on any convenient device with a suitable user interface and capable of establishing communication with the device 100, such as without limitation a smart phone, tablet computer, personal computer, set top box, TV, etc., as appropriate for a particular embodiment. In other embodiments such a set up application may be incorporated into the device programming itself, utilizing for example a connected TV screen, smart device screen, etc. and an associated controlling device (which may include the smart device, a cloud-based voice service platform device, etc.) having input capabilities, e.g., keys, microphone(s), etc., for use as the user interface. Regardless of the exact form and location of the programming and user interface means, the series of steps which may be performed by a set up application when configuring the device 100 for operation with a specific set of appliances remains similar. Accordingly, it will be appreciated that the methods comprising the illustrative set up application presented below in conjunction with FIGS. 8 and 9 may be generally applied, mutatis mutandis, to various alternative set up application embodiments.

Figure 8:
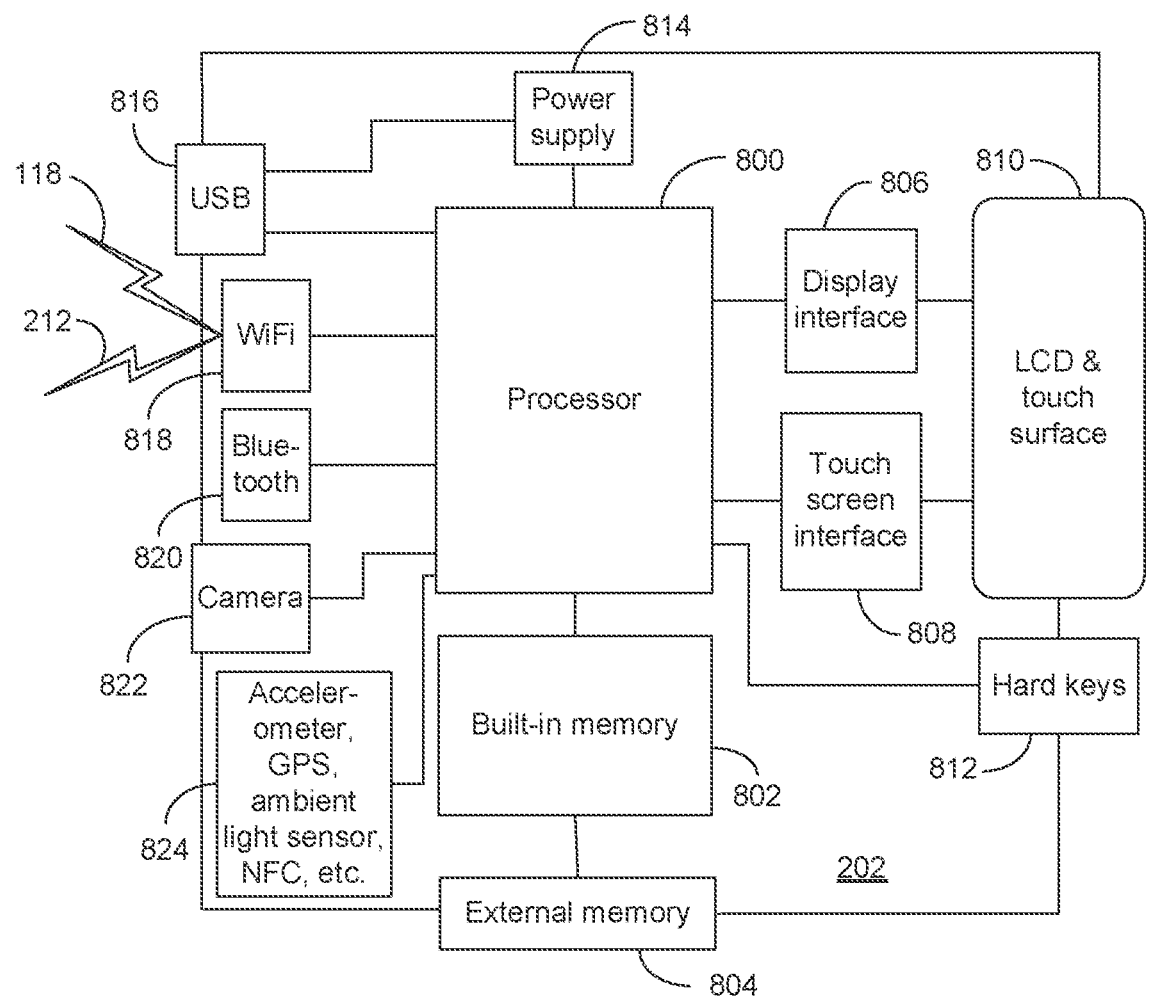
FIG. 8 illustrates a block diagram of an exemplary smart device which may support a remote control app and a setup method for use in configuring the smart device as a controlling device.

With reference to FIG. 8, as known in the art a tablet computer such as the exemplary device 202 of FIG. 2 may comprise, as needed for a particular application, a processor 800 memory 802 which memory may comprise a combination of ROM memory, RAM memory, and/or non-volatile read/write memory and may take the form of a chip, a hard disk, a magnetic disk, an optical disk, a memory stick, etc., or any combination thereof. In some embodiments, provision may also be made for attachment of external memory 804 which may take the form of an SD card, memory stick, or the like. Hardware provisioned as part of an exemplary tablet computer platform may include a microphone, an LCD touchscreen 810 with associated display driver 806 and touch interface 808; hard keys 812 such as for example a power on/off key; a USB port 816; "WIFI" transceiver and interface 818; a "BLUETOOTH" transceiver and interface 820; a camera 822; and various other features 824 as appropriate for a particular embodiment, for example an accelerometer, GPS, ambient light sensor, near field communicator; etc. The electronic components comprising the exemplary tablet computer device 202 may be powered by a battery-based internal power source 814, rechargeable for example via USB interface 816.

Memory 802 may include executable instructions that are intended to be executed by the processor 800 to control the operation of the tablet computer device 202 and to implement various functionalities such as Web browsing, game playing, video streaming, etc. As is known in the art, programming comprising additional functionalities (referred to as "apps") may be downloaded into tablet computer 202 via, for example, "WIFI" interface 818, "USB" 816, external memory 804, or any other convenient method. As discussed previously, one such app may comprise a control app, for example as that described in co-pending U.S. patent application Ser. No. 13/329,940 of like assignee and incorporated herein by reference in its entirety, which app may be for use in commanding the operation of appliances 106, 108, 110 and/or 120 via device 100 and/or for otherwise enabling the device 202 to communicate with device 100. In order to initially configure device 100 to match the appliances to be controlled and to establish an appropriate command matrix, tablet computer 202 may also be provisioned with a setup app 214, either as part of a control app or as separately downloadable app.

Figure 9:
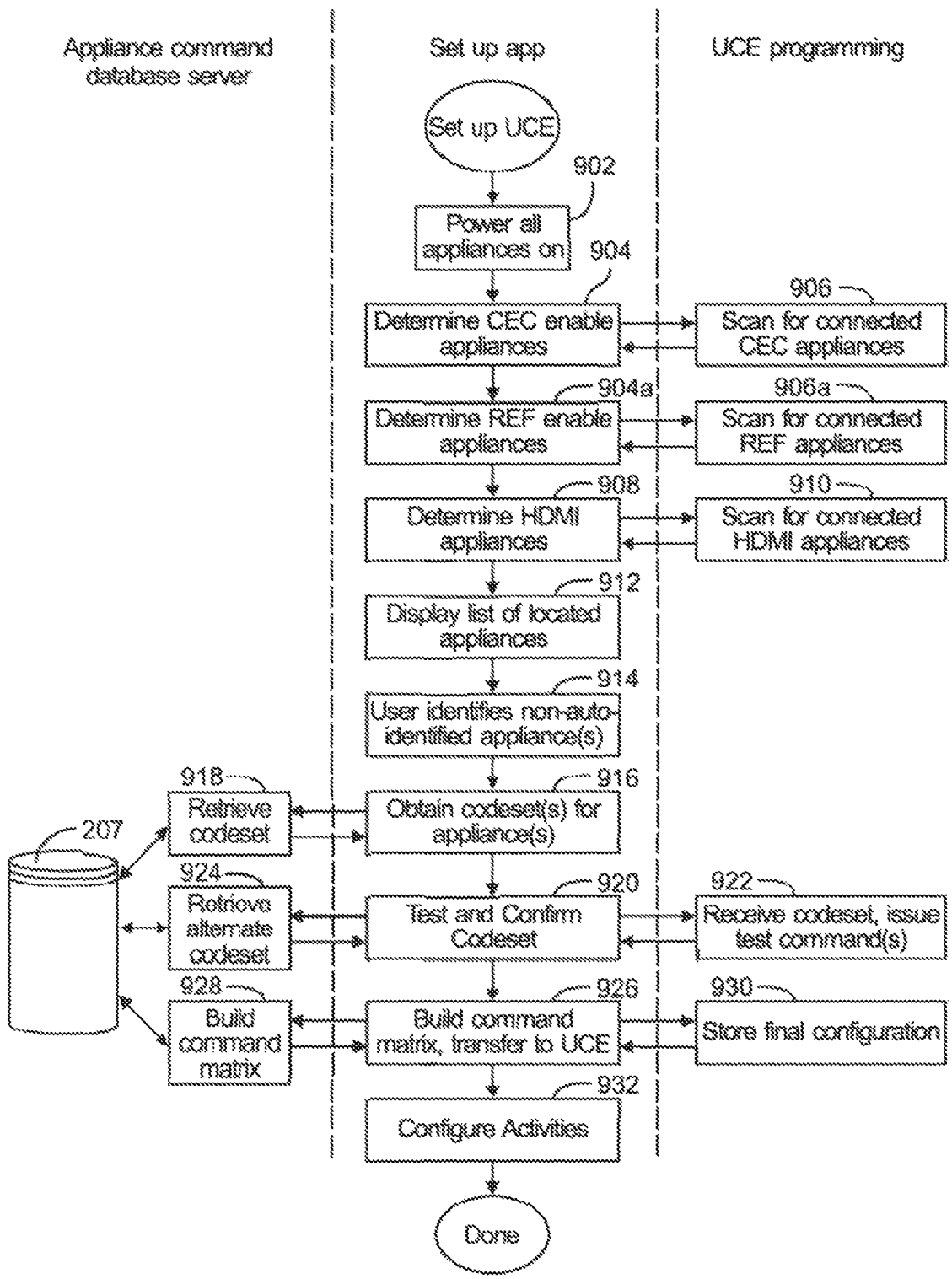
FIG. 9 illustrates an exemplary series of steps which may be performed in order to set up and configure the smart device of FIG. 8.

With reference now to FIG. 9 such a setup app, upon being invoked at step 902 may initially request that the user place all of the appliances to be controlled into a known state, e.g., powered on, in order to enable the appliance detection and/or testing steps which follow. In some instances, this step may be omitted if it is determined that all appliances that are known to be within the ecosystem are already in a desired state, e.g., powered on. This determination may be monitored by monitoring the state of hardware that is associated with or otherwise connected to any such appliances. Next, at steps 904 and 904*a* the setup app may determine the identity of those appliances (and, thereby, determine those appliances which are CEC-enabled, RF enabled (e.g., RF4CE-enabled), etc.) This may be accomplished by communicating a request to the associated device 100, which at step 906 may, for example, cause the device programming to scan connected "HDMI" devices for appliances which are CEC-enabled and/or identifiable via interaction over the "HDMI" interface, for example as described in co-pending U.S. patent application Ser. No. 13/198,072, of like assignee and incorporated herein by reference in its entirety, and communicate such appliance identities to the setup application. Likewise, this may be accomplished by communicating a request to the associated device 100, which at step 906*a* causes the device programming to scan for appliances which are RF-enabled and/or identifiable via interaction over one or more communication interfaces.

Thereafter, at step 908 the setup application may determine if additional non-CEC appliances are connected to the device 100 via the "HDMI" interface. This may be accomplished by requesting the device programming to scan for any further "HDMI" connections at step 910 and communicate the findings back to the setup application. Though not illustrated, it will be appreciated that where appropriate for a particular embodiment the device programming may conduct similar scans to in order to discover appliances connected via Ethernet, "USB," "BLUETOOTH," "RF4CE," "WIFI," etc., where such interfaces may be provisioned to a device 100.

Thereafter, at step 912 the setup application may display or otherwise communicate a listing of detected appliances (both identified and not yet identified) to the user. At step 914, the user may be prompted to enter appliance identifying information for those "HDMI" or otherwise connected appliances which were detected but not identified, as well as identifying information regarding any additional appliances which may form part of the system to be controlled but are not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; etc.; or any combination thereof as appropriate for a particular embodiment.

As noted above, once sufficient identifying information has been acquired, at step 916 the setup app may communicate that information to a database/cloud server, for example server 206, for performance of step 918, comprising identification of and retrieval of command codeset and capability data corresponding to the identified appliances from a database 207 and/or one or more appropriate "skills," and provision this data/programming to the setup application for processing and ultimate transfer to the device 100 in whole or in part. As will be appreciated, a transferred codeset may comprise complete command data values, formatting information, and/or one or more further transmission related parameters that would be used to transmit a command via a wireless connection, e.g., IR, RF, etc., or via a wired connection, may comprise one or more pointers to such command data values, formatting information, and/or one or more further transmission related parameters that are already stored in the memories 502 and/or 802/804 of the device 100 or the device upon which the setup application is currently resident, or a combination thereof. Where necessary, for example when database 207 may contain alternate codesets for an identified appliance, or where uncertainty exists regarding a particular appliance model number, etc., at steps 920, 922, and 924 various control paradigms and/or command data sets may be tested against the appliances to be controlled. Such testing may take the form of soliciting user response to effects observable commands, monitoring of "HDMI" interface status changes as described for example in U.S. patent application Ser. No. 13/240,604, of like assignee and incorporated herein by reference in its entirety, or any other method as convenient for a particular application. Once appropriate codesets have been fully determined, at steps 926,928 and 930 a suitable preferred command matrix, for example as illustrated in FIG. 7, may be constructed and stored into the memory 502 of exemplary device 100, the matrix being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g., apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said preferred command matrix may be performed at the database server or within the setup application, or a combination thereof, depending on the particular embodiment. Once a preferred command matrix has been finalized and stored in the device 100, at step 932 a series of desired appliance configurations associated with specific user activities may be configured and stored into the device 100, as will be now be described.

Figure 10:
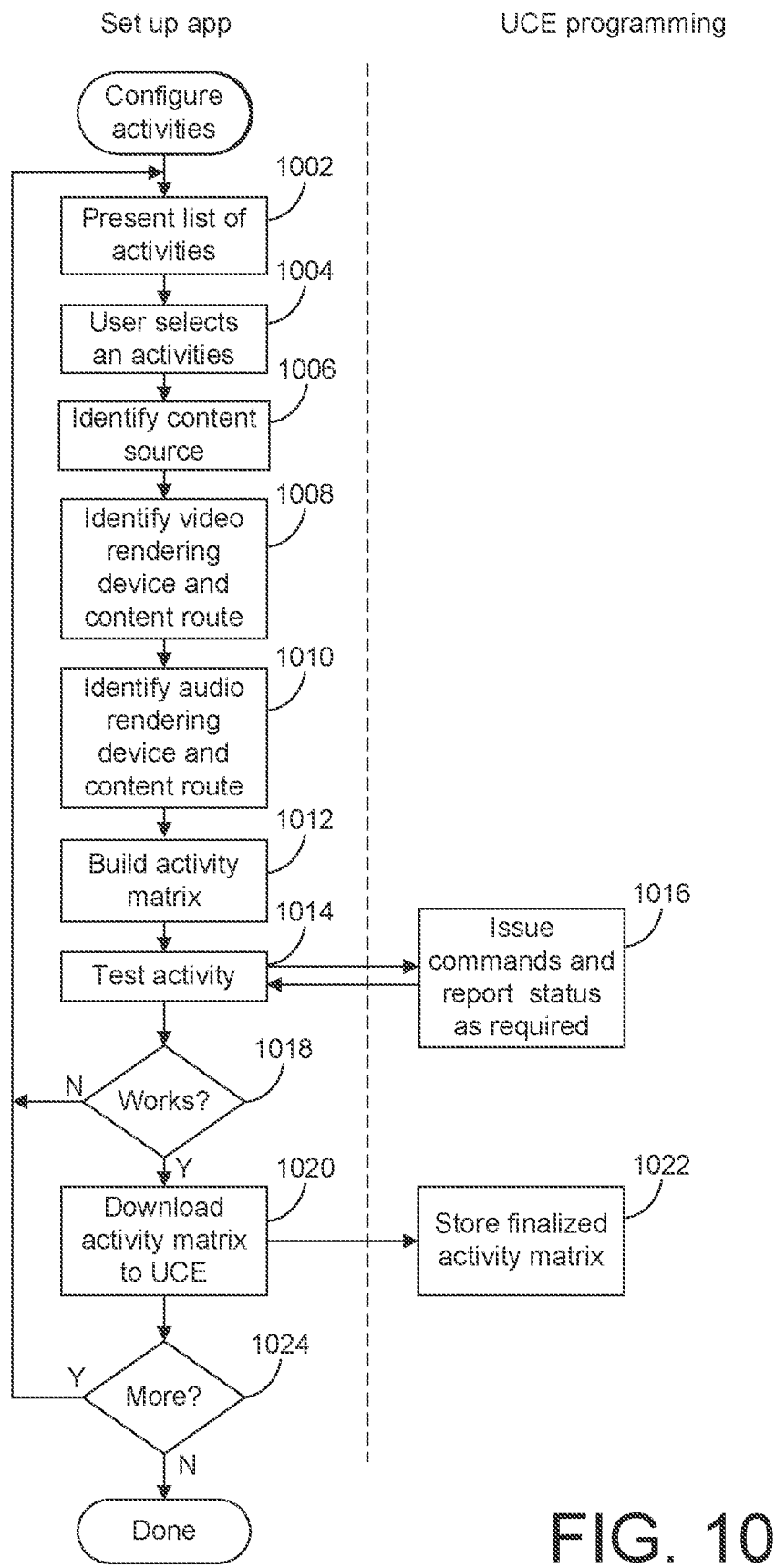
FIG. 10 illustrates an exemplary series of steps which may be performed in order to define to a control device an appliance configuration which corresponds to a user activity.

Upon completion and storage of a preferred command matrix, an exemplary setup application may subsequently guide a user through a series of steps in order to establish the desired appliance configurations for a series of possible activities. With reference to FIG. 10, at step 1002, the user may be presented with a list of possible activities, e.g., "Watch TV", "Watch a movie", "Listen to music", etc. In some embodiments, the user may also be able to edit activity titles and/or create additional user defined activities. At step 1004 a user may select a particular activity for configuration, for example "Watch TV". At step 1006, the user may be prompted to identify the content source for the activity being configured, for example cable STB/DVR 110 for the exemplary "Watch TV" activity. Such a prompt may take the form of a listing of eligible appliances as determined during the foregoing appliance set up steps; explicit user provision of an appliance type; etc. Next, at steps 1008 the user may be prompted in a similar manner to select video and audio rendering appliances for use in this activity, for example TV 106 and AVR receiver 120 respectively. Depending upon the system topography and the interfaces in use (i.e. "HDMI"/ CEC, IP, analog, etc.) the set up application in concert with device programming may be able to ascertain which input port of each rendering appliance is attached to the content source appliance identified for this activity and/or if any intermediate switching appliance is in use (for example AV receiver 420 of the system illustrated in FIG. 4). Where such information is obtainable, the set up application may automatically create all or part of an appropriate rendering device input selection for the activity being configured. If not, at steps 1008 and 1010, the user may be additionally requested to identify the applicable content route(s) to the rendering appliances, e.g., input port numbers, presence of intermediate switches, etc. During or upon conclusion of steps 1004 through 1010, the set up application may construct an activity matrix, for example as illustrated in FIG. 11. By way of example, activity matrix 1100 for a "Watch TV" activity may comprise a series of cells, for example 1110 or 1112, each corresponding to a desired configuration of a particular state 1106 or function 1108 of a specific appliance 1104 during the specified activity. By way of example, cell 1110 may indicate that the input of AV receiver 120 is to be set to "S/PDIF2", while cells 1112 and 1114 may indicate that transport function commands (e.g., "play", "pause", "fast forward" etc.) are to be directed to STB/DVR 110 and not to DVD 114. In this regard, it will be appreciated that while in some embodiments the assignment of functions such as, for example, volume control, to specific appliances during a particular activity may be performed within an individual controlling device, i.e., the controlling device may determine the appliance to which volume control commands are to be directed, in a preferred embodiment this assignment may be performed within the device 100, thereby ensuring consistency across each activity when multiple controlling devices are present in an environment, for example devices 102 and 104 of the environment illustrated in FIG. 1.

Returning now to FIG. 10, at steps 1014 and 1016 the newly-constructed activity matrix 1100 may be tested by causing the device programming, utilizing preferred command matrix 700, to issue the commands necessary to place the identified appliances into the desired state and thereafter receiving verification at step 1018 that the desired activity was successfully initiated. It will be appreciated that such verification may comprise, for example, detection and reporting of "HDMI" or other content streams and/or appliance status by device programming by directly monitoring CEC status or by using methods such as described for example in U.S. patent application Ser. No. 13/240,604; solicitation of user input confirming correct operation; monitoring for presence or absence of analog input signals; recording of appliance status or error messages; etc.; or any combination thereof as appropriate for a particular embodiment.

If testing is unsuccessful, at step 1018 the set up application may return to step 1002 to allow reconfiguration of that activity and/or definition of alternative activities. If testing was successful, at steps 1020 and 1022 the completed activity matrix, for example 1100 as illustrated in FIG. 11, may be transferred to the device 100 for storage in device memory 502. Thereafter, at step 1024 the user may be offered the opportunity to return to step 1002 to define additional activity configurations, for example 1101,1102 as illustrated in FIG. 11, or to exit the activity configuration process.

Figure 13:
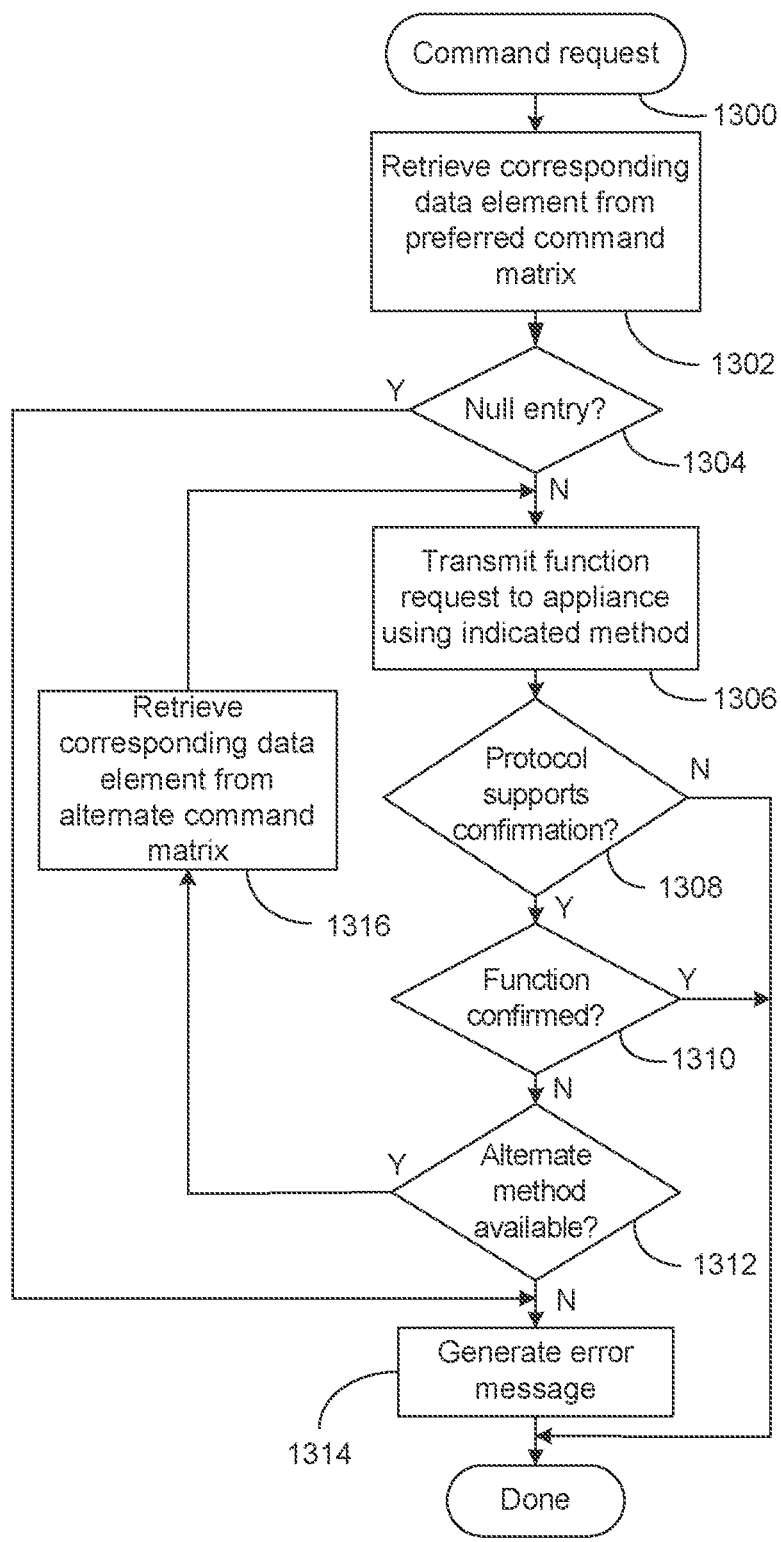
FIG. 13 illustrates an exemplary series of steps which may be performed by a controlling device in issuing a function command to an appliance.

With reference now to FIG. 13, the series of steps performed by the device programming in order to convey a function command to an appliance in accordance with a command request 1300 received from a controlling device such as remote control 102 or 200, smart device 104 or 202, via voice input, etc., or in accordance with an internally generated requirement resulting from receipt of an activity request (as will be described hereafter) may initially comprise retrieval from a preferred command matrix that data element which corresponds to the requested command and target appliance. By way of specific example, receipt of a "TV power on" request from remote control 102, via voice input, or the like at a device 100 provisioned with the preferred command matrices illustrated in FIG. 7 may cause retrieval of data element 720, indicating that the command is to be communicated to the TV appliance, e.g., television 106, using an "HDMI"/CEC command. At step 1304, the device programming may determine if the retrieved value constitutes a null element. If so, the referenced appliance does not support the requested command and accordingly at step 1314 an error message may be generated and the process thereafter terminated. As will be appreciated, the exact nature of such an error message may depend upon the particular embodiment and/or the requesting controlling device: for example, if the request originated from a controlling device which is in bidirectional communication with the device the error may be communicated back to the requesting device for action, i.e., display to the user, illuminate a LED, activate a buzzer, etc. as appropriate. Alternatively, in those embodiments where a device 100 is incorporated into an appliance as device 100', that appliance's front panel display, LEDs, speaker, etc. may be utilized.

If the retrieved preferred command matrix element data is valid, at step 1306 the device 100 may communicate the corresponding function command to the target appliance using the indicated command value and transmission method, e.g., for the exemplary data element 720 this may comprise issuing a CEC "power on" command to CEC logical device address zero (TV) via the device's "HDMI" interface 508. Once the command has been issued, at step 1308 the device programming may determine if the communication interface and protocol used in issuing the command provides for any confirmation mechanism, i.e., explicit acknowledgement of receipt, monitoring of "HDMI" status on an interface, detection of a media stream or HDCP handshake, etc. If not, for example the command was issued using a unidirectional IR signal and no other confirmation means such as power or input signal monitoring is available, the device programming may simply assume that the command was successful and processing is complete. If, however, confirmation means exists, at step 1310 the device programming may wait to determine if the command was successfully executed. Once positive confirmation is received, processing is complete. If no confirmation or a negative confirmation is received, at step 1312 the device programming may determine if an alternative method is available to communicate the command to the target appliance. Returning to the specific example presented above this may comprise accessing a secondary command matrix 716 in order to determine if an alternative communication method is available for the specific function, e.g., "TV power on." If an alternative does exist, at step 1316 the substitute command value and transmission method may be retrieved and processing may return to step 1306 to initiate an alternative attempt. Returning again to the specific example, if the CEC "power on" command corresponding to data element 720 of matrix 700 issued to TV 106 cannot be confirmed, an IR "power on" command encoded according to SIRCS (Sony Infrared Control System) in correspondence with the equivalent data element in secondary matrix 716 may be attempted as a substitute.

In addition to relaying individual command requests as described above, an exemplary device 100 may also support activity selection, whereby receipt of a single user request from a controlling device, via voice input, or the like may cause a series of commands to be issued to various appliances in order to configure a system appropriately for a particular user activity, such as for example, watching television. To this end a set of matrices defining desired equipment states suitable to various activities, for example as illustrated at 1100 through 1102 of FIG. 11, may be stored in device memory 502 for access by device programming when executing such a request. As illustrated in FIG. 12, in some embodiments the programming of an exemplary device 100 may maintain an additional matrix 1200 representative of the current state of the controlled appliances, arranged for example by appliance 1202 and by operational state 1204. By way of example, data elements 1206 and 1208 in the illustrative table 1200 may indicate that TV 106 is currently powered on (1208) with "HDMI" port number 2 selected as the input (1206). The data contents of the elements in such a table may be maintained in any convenient manner as appropriate to a particular embodiment, for example without limitation retrieval of "HDMI"/CEC status; monitoring input media streams and/or HDCP status; measuring power consumption; construction of a simulated appliance state such as described for example in U.S. Pat. No. 6,784,805; etc.; or any combination thereof. In the case of certain appliances, such as for example AV receiver 120 which may be controllable only via unidirectional IR, the current state of the appliance may not be discernible. In such cases, a null data element 1210 maybe entered into exemplary matrix 1200 to indicate that this appliance may require configuration using discrete commands only and/or user interaction. As will be appreciated, in some embodiments the data contents of the illustrative table may be maintained in memory 502 on an ongoing basis by device programming, while in other embodiments this data may be gathered "on the fly" at the time the activity request is being processed. Combinations of these methods may also be used, for example "on the fly" gathering for appliances connected via an HDMI bus combined with maintenance of a simulated state for appliances controlled via IR signals.

Figure 14:
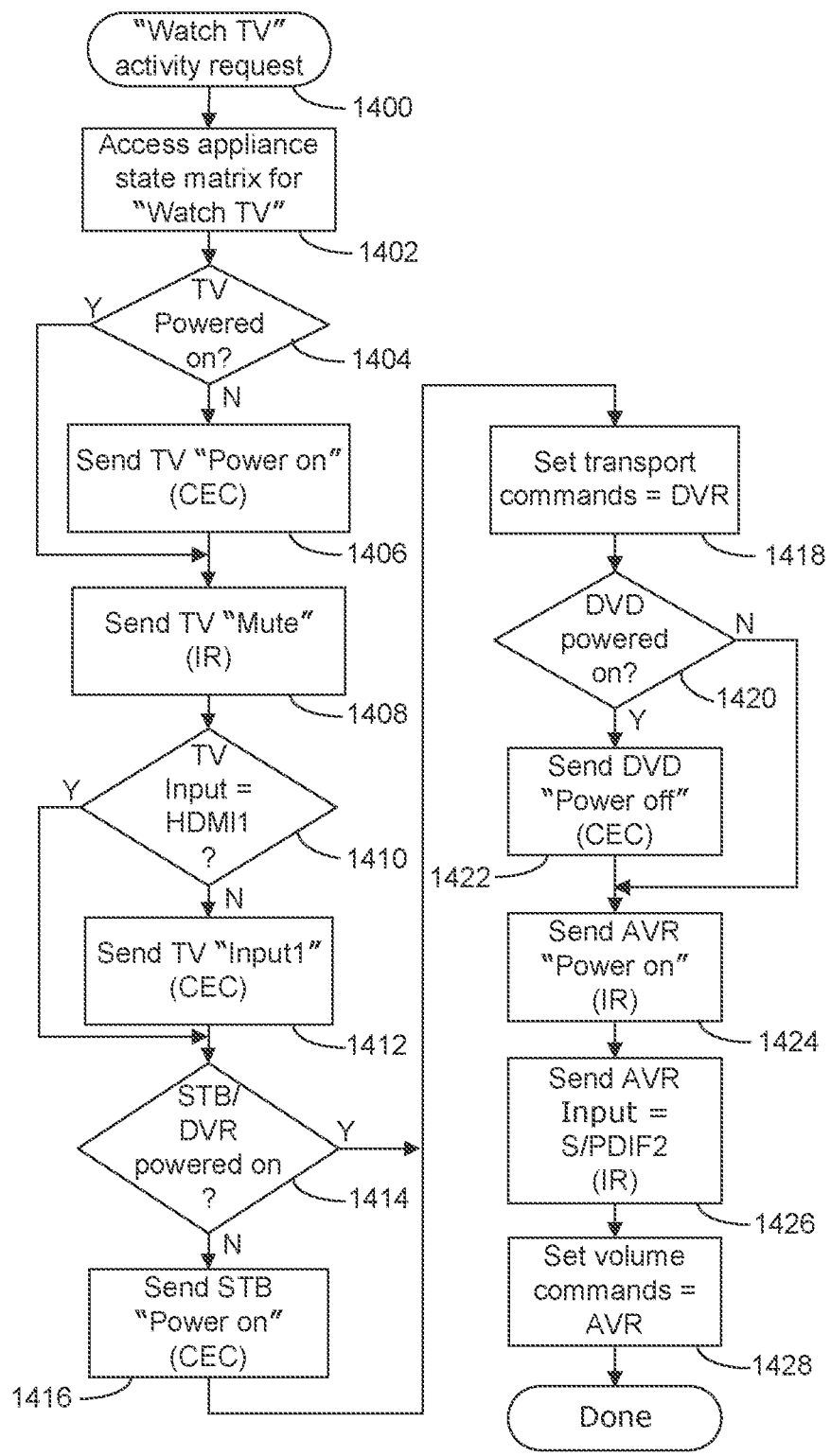
FIG. 14 illustrates an exemplary series of steps which may be performed by a controlling device in establishing appliance states matching a desired activity defined in one of the matrices of FIG. 11.

In order to configure a group of appliances for a desired activity, device programming may compare a desired state matrix, for example 1100, to a current state matrix, for example 1200, element by element, issuing commands as necessary to bring appliances to the desired state. By way of example, an exemplary series of steps which may be performed by the programming of a device in order to effect a "Watch TV" activity configuration will now be presented in conjunction with FIG. 14. For the purposes of this example, the reader may also wish to reference the equipment configuration of FIG. 1 and the activity and current state matrices 1100 and 1200 of FIGS. 11 and 12.

Upon receipt of a "Watch TV" request 1400, at step 1402 the exemplary device programming may access an applicable appliance state matrix 1100. Next, at step 1404 it may be determined by the device programming whether the present "power" state of TV 106 as indicated by current state matrix 1200 matches the desired state stored in the corresponding data element of matrix 1100. If the states match, processing may continue at step 1408. If the states do not match, at step 1406 a "power on" command may be communicated to TV 106. As will be appreciated from the earlier discussion in conjunction with FIG. 13 and inspection of exemplary preferred command matrix 700, in the illustrative system communication of the "power on" command to TV 106 may comprise a CEC command issued over "HDMI" connection 112. Next, at step 1408 a "mute" command may be communicated to TV 106, since element 1116 of illustrative matrix 1100 indicates that TV106 is not the primary audio rendering appliance. In accordance with preferred command matrix 700, communication of the "mute" command to TV 106 may comprise an IR transmission 114. Thereafter, at steps 1410,1412 the active input of TV 106 may be set to "HDMI1" via a CEC command, and at steps 1414,1416 a CEC "power on" command may be communicated to STB/DVR 110 if that appliance is not already powered on. At step 1418, the exemplary device programming may set an internal status to indicate that future transport command requests (e.g., play, pause, FF, etc.) should be routed to STB/DVR 110, as indicated by element 1112 of matrix 1100. Thereafter, at steps 1420,1422 a CEC "power off" command may be communicated to STB/DVR 108 if that appliance is not already powered off. Thereafter, at steps 1424 and 1426 "power on" and "input S/PDIF2" commands may be communicated to AV receiver 120 via IR signals. As will be appreciated, it may not be possible to determine the current status of AV receiver 120, as indicated for example by elements 1210 and 1220 of matrix 1200, and accordingly so-called "discrete," or explicit, function commands may be issued which may establish the desired status regardless of the current state of the appliance. Finally, at step 1428 the exemplary device programming may set an internal status to indicate that future volume control command requests (e.g. volume up/down, mute) should be routed to AV receiver 120, as indicated by element 1118 of matrix 1100, where after processing of the activity request is complete.

Figure 15:
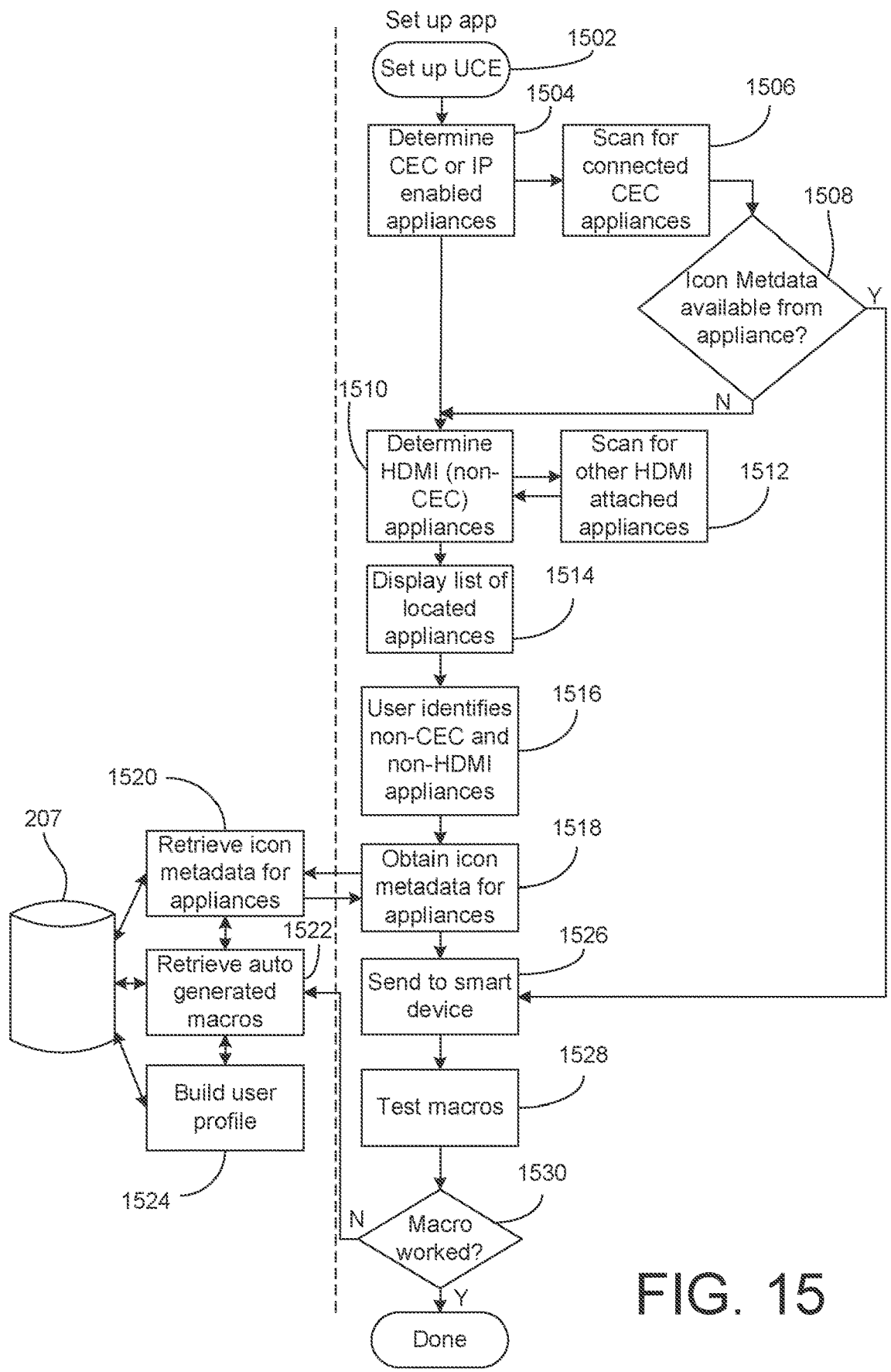
FIG. 15 illustrates an exemplary series of steps which may be performed by a smart device to setup command control macros.

As noted above, the exemplary device 100 may also support activity selection, whereby receipt of a single user request from a smart device, via a voice signal, etc., may cause a series of commands to be issued to various appliances in order to configure a system appropriately for one or more user activities, such as "watch TV," "watch movie," "listen to music," etc. To setup the user interface of the smart device to support such macro command functionality, an exemplary method is illustrated in FIG. 15. More particularly, with reference to FIG. 15, upon invocation of a setup app at step 1502 a user may be requested to place all of the appliances to be controlled into a known state, e.g., powered on or already joined in a wireless network, in order to enable the appliance detection and/or testing steps which follow. Next, at step 1504 the setup app may determine the identity of those appliances, and thereby determine which of those appliances are CEC-enabled or IP enabled. This may be accomplished by communicating a request to the associated device 100, which at step 1506 may cause the device programming to scan connected "HDMI" devices for appliances which are CEC-enabled and/or identifiable via interaction over the "HDMI" interface, for example as described in co-pending U.S. patent application Ser. No. 13/198,072, of like assignee and incorporated herein by reference in its entirety, and communicate such appliance identities to the setup application. Next, at step 1508 the setup app may also determine if the appliances have any associated icon information (for example stored as metadata on the appliance, available from a remote server, or the like) as well as information related to interface connection types, e.g., "WIFI," "HDMI" input/output, for use in the creation of supported macros. If the icon information is available, the icon information may be sent to the smart device by the appliance and/or retrieved by the smart device using other information provided by the appliance as appropriate as shown in step 1526. An icon corresponding to the icon information may then be automatically added to the user interface of the smart device whereupon an activation of the added icon may be used to provide access to command and control functionalities associated with the corresponding controllable device, including commands in the form of a listing of automatically generated macros available for that controllable device as described below. Thus, icon information provided to the smart device may be used in connection with information stored on the smart device, stored in the internet cloud and/or at a remote server to automatically add an icon to the user interface of the smart device where the icon can be in the form of a logo for the controllable appliance, icons in the form of logos for content (e.g., television station logos) that can be accessed via the controllable appliance, etc. In a further illustrative embodiment, icons may function as soft keys which may be selected to cause the performance of a further action for example, to display a device control page (e.g., to present television control soft keys such as channel up, channel down, etc.), cause the transmission of commands, etc. as described for example in U.S. patent application Ser. No. 10/288,727, (now U.S. Pat. No. 7,831,930) of like assignee and incorporated herein by reference in its entirety, or any other method as convenient for a particular application. In a similar manner, an appropriate app or "skill" can be retrieved for use by the smart device, for example from a cloud-based service, to enable the smart device (which may or may not include an associated display) to provide an appropriate user interface, to receive input via use of a voice signal, and/or to enable transmission and/or receipt of desired signals to and/or from the device 100.

The setup application then continues to step 1510 (after scanning for CEC connected appliances as discussed above) whereat the setup application may next determine if additional non-CEC appliances are connected to the device 100 via the "HDMI" interface. This may be accomplished by requesting the device programming to scan for any further "HDMI" connections at step 1512 and communicate the findings back to the setup application. Though not illustrated, it will be appreciated that, where appropriate for a particular embodiment, the device programming may conduct similar scans in order to discover appliances connected via Ethernet, "USB," "BLUETOOTH," "RF4CE," "WIFI," etc., where such interfaces may be provisioned to a device 100.

Thereafter, at step 1514 the setup application may display, annunciate, etc. a listing of detected appliances (both identified and not yet identified) to the user. At step 1516, the user may then be prompted to provide appliance identifying information for those "HDMI" or otherwise connected appliances which were detected but not identified, as well as identifying information regarding any additional appliances which may form part of the system to be controlled but which were not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; MAC address; etc.; or any combination thereof as appropriate for a particular embodiment.

Once appropriate identifying information has been acquired, at step 1518 the setup app may communicate that information to a database server, for example server 206, for performance of step 1520 in which the database server uses the identification information to retrieve icon information as needed (e.g., when such data was not obtainable from the appliance), command information and/or app/"skill" programming as discussed previously, and in step 1522, to automatically generate executables, including macros which correspond to the appliance or a plurality of appliances considering their capability data as maintained in a database 207 and/or as retrieved from the appliances. Any such data gathered from and/or created by the server 206 will then be provisioned to the setup application for processing and ultimate transfer to the smart device and/or device 100 as required. As will be appreciated, the transferred information and/or metadata may comprise user interface data, complete command data values, appliance input/output data and current status, formatting information, pointers to command data values and formatting information already stored in the memories 502 and/or 802/804 of the device 100 or the device upon which the setup application is currently resident, etc. Where necessary, for example when database 207 may contain alternate codesets, icon metadata, or macro information for an identified appliance, or where uncertainty exists regarding a particular appliance model number, etc., at steps 1528, 1530, and 1522 various control paradigms and/or command data sets may be tested against the appliances to be controlled. Such testing may take the form of soliciting user response to effects observable commands, monitoring of "HDMI" interface status changes as described for example in U.S. patent application Ser. No. 13/240,604, of like assignee and incorporated herein by reference in its entirety, or any other method as convenient for a particular application. Once appropriate codesets and macro operations have been fully determined, at steps 1528 and 1530 a suitable preferred user profile 1524, may be constructed and stored into the memory 502 of exemplary device 100, the user profile 1524 being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g., apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said user profile 1524 may be performed at the database server or within the setup application, or a combination thereof, depending on the particular embodiment.

Figure 16:
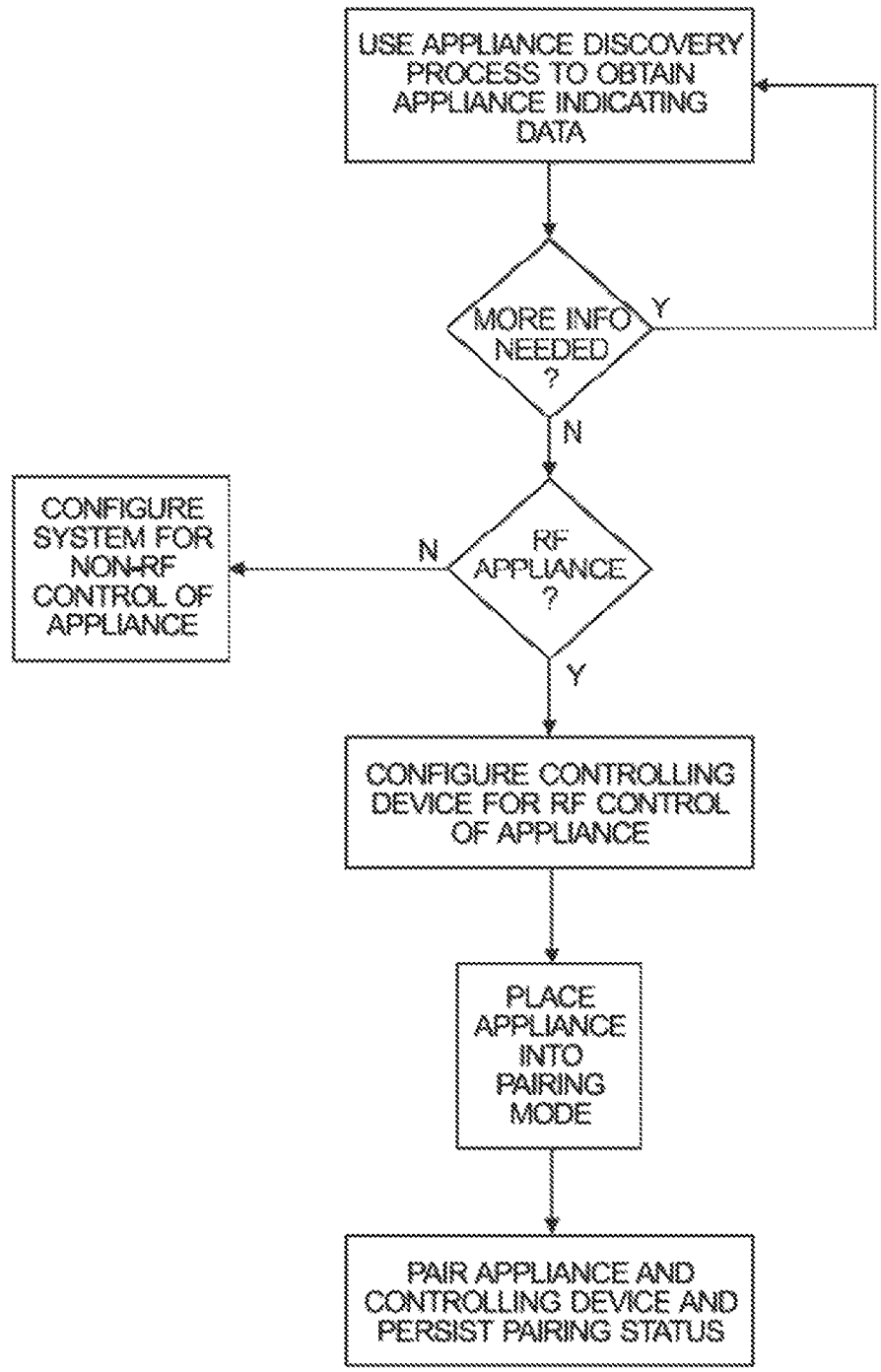
FIG. 16 illustrates an exemplary series of steps which may be performed to configure a controlling device for issuing command communications via use of RF communication methodologies

It is also contemplated that the methods described above can be used to provide a device 100 with universal RF controlling capabilities. To this end, as illustrated in FIG. 16, a host device, e.g., a device 100 having some or all of the functionalities described above, can use an appliance discovery process, which may entail using a multi-cast discovery schema, to obtain information about one more appliances 106, 108, 110, etc. For example, the host device may, through use of the appliance discovery process, such as described in U.S. application Ser. No. 13/198,072, receive from an appliance through use of an interconnection with the appliance, e.g., a wired or wireless coupling between the appliance and the host device, first appliance related data, e.g., appliance ID, brand name, model number, name, parameters associated with a communication methodology supported by the appliance, etc. The first appliance related data retrieved from the appliance (if the first appliance related data does not itself indicate that the appliance is responsive to a particular RF protocol) can then be used to determine if the first appliance related data received from the appliance corresponds to a single one of the plurality of appliance records/appliance profiles that are stored within a database (for example, a database associated with a cloud server) or multiple ones of the plurality of appliance records stored within the database as described previously. It is to be further appreciated that such information may be obtained by reading such information from a provided token, QR code, or the like as also described previously.

When it is determined that the first appliance related data received from the appliance corresponds to a single one of the plurality of appliance records stored within the database and the single one of the plurality of appliance records indicates that the appliance is adapted to receive command communications via use of a RF communications channel, e.g., the appliance is "RF4CE" compliant, an RF codeset identifier associated with the one of the plurality of appliance records may be used to select from a plurality of codesets the RF codeset that is supported by that appliance. A controlling device in communication with the host device (or the host device itself) can then be provisioned with the indicated RF codeset—as described above—to thereby configure the controlling device (or the host device in the event the host device is intended to be a controlling device) to issue commands directly to the appliance, via use of a RF transmitter, where the command that is caused to be issued for reception by the appliance will correspond to a command event received at the controlling device, e.g., an event indicative of an input element being activated, a communication being received from an external device, etc. Likewise, via use of such gathered information, a smart device in communication with the device 100 can be provisioned with an app/"skill" to provide an appropriate user interface, to receive input via use of a voice signal, and/or to enable transmission and/or receipt of desired signals to and/or from the device 100 as needed or required.

When it is determined that the first appliance related data received from the appliance corresponds to multiple ones of the plurality of appliance records within the database, further appliance related data, e.g., further ones of appliance ID, brand name, model number, name, parameters associated with a communication methodology supported by the appliance, etc., is preferably caused to be iteratively received from the appliance through use of the same or other interconnections with the appliance until such time as no further appliance related data is capable of being retrieved from the appliance or until such time as all appliance related data received from the appliance corresponds to a single one of the plurality of appliance records stored within the database. Again, as before, when it is determined that the collective appliance related data received from the appliance corresponds to a single one of the plurality of appliance records within the database and the single one of the plurality of appliance records indicates that the appliance is adapted to receive command communications via use of a RF communications channel, e.g., the appliance is "RF4CE" compliant, an RF codeset identifier associated with the one of the plurality of appliance records may be used to select from a plurality of protocol codesets the RF codeset that is supported by that appliance. A controlling device, e.g., remote control 104 in communication with the host device (or the host device itself), can then be provisioned with the indicated RF codeset to thereby configure the controlling device (or the host device) to issue commands directly to the appliance, via use of a RF transmitter, where the command issued will correspond to a command event. Thus, it is to be appreciated that automatic device discovery and pairing actions described herein may be possible using partial data received from and or communicated via one or more input/output connections of one or more protocol types and that the controlling device having device 100 functionality may accordingly have multiple input/output connections and support one or more protocol types. For example, the controlling device having device 100 functionality may support "BLUETOOTH" low energy (BLE), "ZIGBEE," and/or "RF4CE" or otherwise use the same radio but with a different network protocol stack without limitation.

Once the appliance discovery and configuration processes have been completed and the controlling device loaded with the specific profile for the appliance, a RF pairing operation between the controlling device and the appliance is caused to be performed. In some instances, a command to place the appliance into a state for pairing the appliance with the controlling device may be transmitted to the appliance, whether initiated automatically upon conclusion of the discovery and configuration processes or initiated manually, via use of a protocol, e.g., IR, IP, CEC, etc., that the appliance profile indicates the appliance is responsive to. In this regard, the command for placing the appliance into a state for pairing may be issued from the controlling device or the host device as desired and in keeping with communication links available for use in transmitting such a command. In other instances, human interaction with a pairing button or other input element provided on the appliance to place the appliance into a pairing state may be required for this purpose. In the pairing state, the devices will exchange pairing information as needed to allow the devices to be subsequently communicatively linked together when proximate to each other whereby the controlling device can be used to communicate commands to the appliance via use of the appropriate RF protocol. If needed, a user may be required to enter a pin into the system, as known in the art, to facilitate such pairing. An exemplary communication exchange to facilitate a pairing between a remote control and an appliance for use in transmitting "RF4CE" commands to the appliance may be found in U.S. Pat. No. 9,866,892 the disclosure of which is incorporated herein by reference in its entirety.

Once an appliance and a controlling device are paired, it will be appreciated that if it is determined that the appliance does not respond to a command transmitted via use of a provisioned RF protocol, e.g., determined by monitoring an "HDMI" connection, other command transmission protocols, such as CEC, IR, etc., can be used to convey a command as described above.

Figure 17:
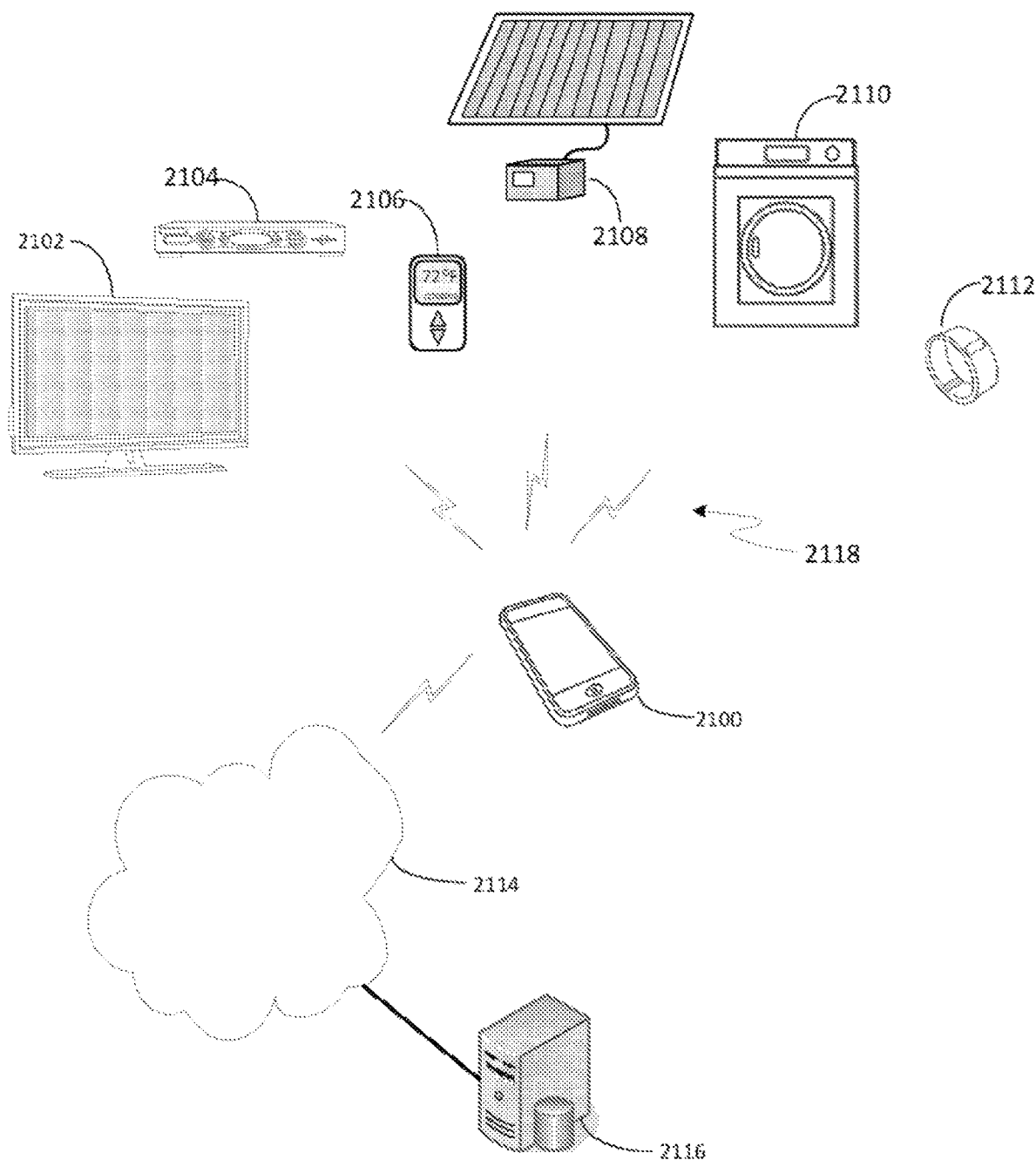
FIG. 17 illustrates an exemplary system in which a smart device may be utilized to interface several different appliances.

As noted above, it is contemplated that, within an exemplary system, such as illustrated in FIG. 17, apps or "skills" installed on a device 2100 may also provide interfaces to various services and/or to controllable appliances, such as, for example, a television 2102, a cable or satellite set top box 2104, a thermostat 2106, a solar power array controller 2108, a clothes washer and/or drier 2110, a personal fitness tracker or pedometer 2112, a media streaming service, a social networking service, etc. In this example, the device 2100 may be device 100 or may be a smart device that is intended to communicate with a device 100 as described above without limitation. The interfaces may be used to display or otherwise annunciate information relevant to the operation and/or states of such services or devices, to receive input relevant to controlling the operation of such services or devices, to communicate with and/or control such services or devices, etc. To this end, the appliances may communicate with device 2100 using an available local wired or wireless network 2118 such as, for example, WiFi, Bluetooth, etc., or any other convenient means. It will be appreciated that depending on the particular networking technology in use various other items such as access points, routers, Internet gateways, etc., may be required in order to fully implement the illustrative network 2118—in the interests of clarity these are omitted from FIG. 17. Also, as illustrated in FIG. 17, smart device 2100 may be adapted to communicate with one or more remote servers 2116 (which may be services) by way of a wide area network 2114, such as for example the Internet.

It should be appreciated that, while an exemplary embodiment is presented herein in terms of a group of household and/or personal appliances 2102 through 2112, the methods described herein may broadly apply to any group of appliances or equipment the elements of which support app driven user interfacing, for example without limitation those as may be found in offices, factories, schools, theaters, etc. Accordingly, the exemplary embodiment described hereafter is intended to be illustrative and not limiting.

Figure 18A:
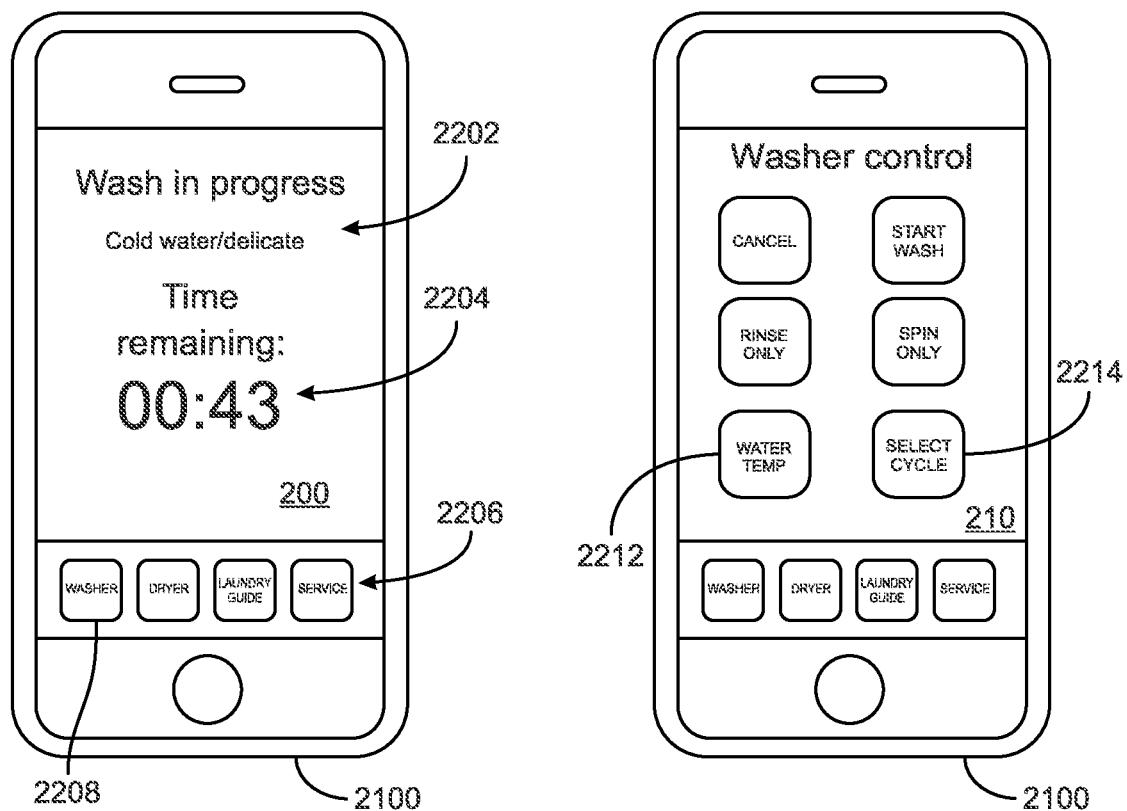
FIGS. 18A and 18B illustrate exemplary smart device generated user interfaces appropriate for interacting with one of the appliances of FIG. 17.
Figure 18B:
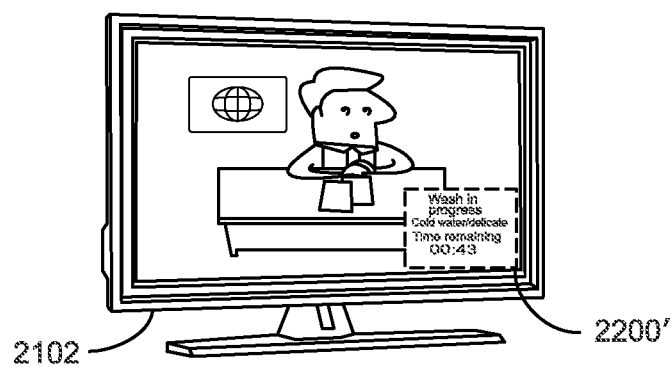

Turning now to FIG. 18A, an exemplary user appliance interface 2200 presented by an app installed on device 2100 is shown by way of illustration. When invoked by a user of the device 2100, such an interface may display a current status of the appliance, in this illustrative example that of a clothes washer, including such exemplary items as the wash cycle currently being performed 2202 and time remaining 2206. User interface 2200 may also include an exemplary user input area 2206 with icons that are activable to access companion appliance (e.g., a clothes dryer), GUIs, user guides, troubleshooting diagnostics, etc., as well as an icon 2208 which may access additional page(s) 2210 of the current device GUI, for example to cancel the current operation, initiate other operations, or to invoke further submenus such as selection of water temperature 2212 or fabric cycle 2214. As illustrated by way of further example in FIG. 2B, an exemplary appliance app GUI 2200' may be adapted as appropriate for use with other types of smart devices, for example a "smart TV" 2102. As will be appreciated, in instances where device 2100 does not itself include a display, the device 2100 can be used in connection with a further device where the further device functions to present the user interface for device 2100. Accordingly, such further device would be provided with the programming required to allow device 2100 to receive communications from and provide communications to the device 2100. Such programming may be provided to the further device via use of a further installed app or "skill." Yet further, it is to be appreciated that any information that is described herein as being presented via use of display can be presented via use of a speaker, e.g., by using synthesized voice, and any information that is described herein as being received via a use of an input element can be received via use of one or microphones, e.g., by receiving voice signals and by processing the received voice signals via use of a cloud-based voice service platform.

In certain embodiments, a displayed GUI page may contain HyperText Markup Language (hereafter referred to as "HTML") links for use in accessing appliance related information and/or services. Since methods for displayed HTML links are well known in the art, they will not be described in greater detail herein. Nevertheless, for additional details pertaining to HTML link operation, the reader may turn to commonly assigned U.S. application Ser. No. 13/542,146 (US 2012/0278693), filed on Jul. 5, 2012, entitled "System and Method for Ubiquitous Appliance Control," the disclosure of which is incorporated herein by reference in its entirety. A displayed HTML page (or speech output, illuminated LEDs, or the like) may also function to provide notifications and which may inform a user that an app update or a new app is available for a single OS or across the different Oss, including cloud-based voice service platform operating systems, in the user's environment for the one or more of appliances. The user may select a displayed link or otherwise provide a voice command to initiate a downloading of an app, an authentication of an app, and/or a commencement of a synchronization process. The GUI may also include selectable links to user manuals for the user appliances which are located within the user's environment or may include links to specific web based literature which may be used to highlight the appliance features, or may notify the user that a new app may be available for a new OS for which an app was not available as of the last synchronization cycle, etc.

Figure 19:
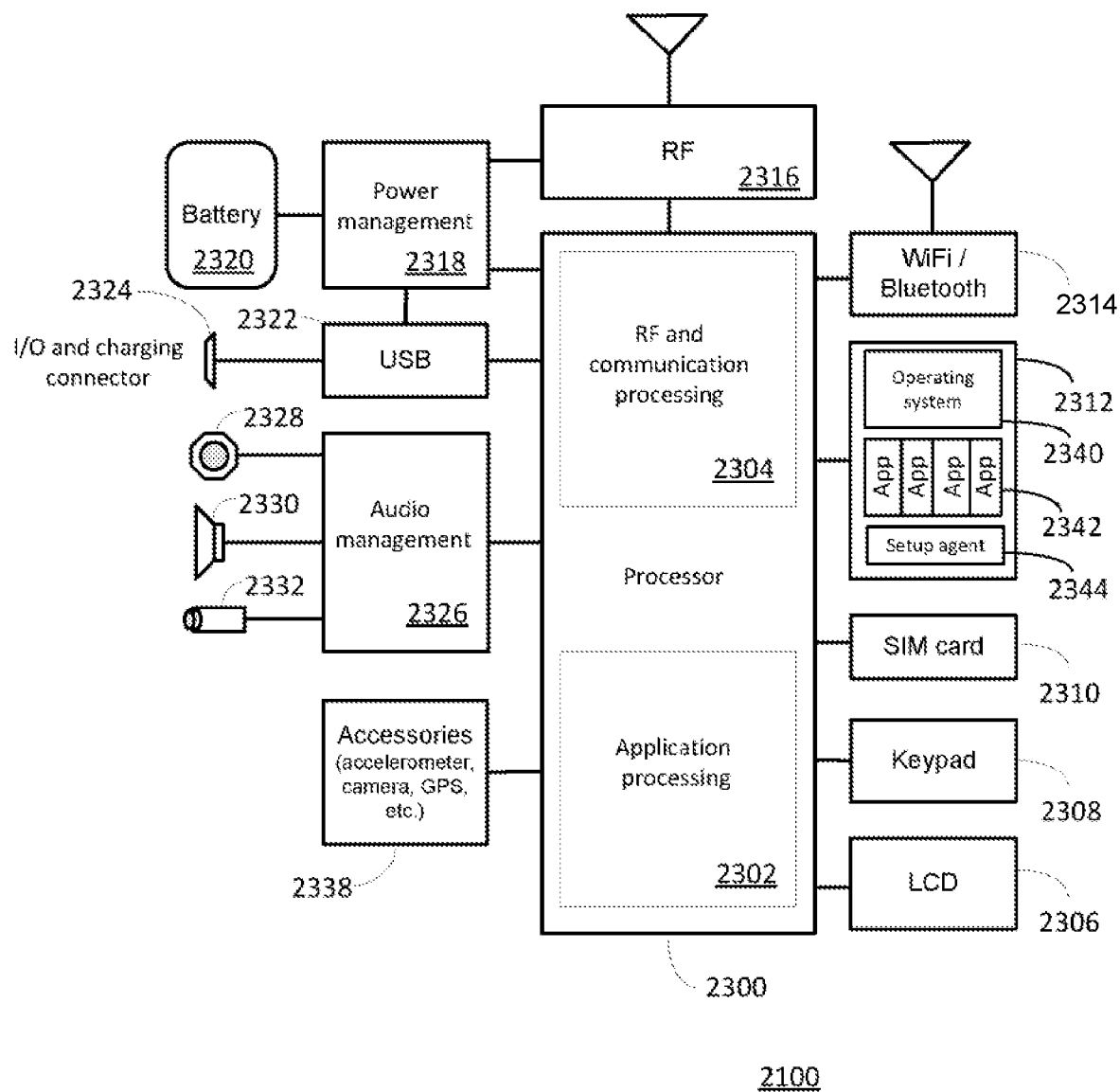
FIG. 19 illustrates in block diagram form an exemplary smart device which may be used in the exemplary systems of FIGS. 17 and 18A.

With reference to FIG. 19, as is known in the art, the smart device 2100 of FIGS. 17 and 18A may include as needed for a particular application, processing means 2300 which may comprise both an application processing section 2302 and an RF/communication processing section 2304; an LCD display 2306; a keypad 2308 which may comprise physical keys, touch keys overlaying LCD 2306, or a combination thereof; one or more microphones, a subscriber identification module (SIM) card 2310; memory means 2312 which may comprise ROM, RAM, Flash, or any combination thereof; "WIFI" and/or "BLUETOOTH wireless interface(s) 2314; a wireless telephony interface 2316; power management circuitry 2318 with associated battery 2320; a "USB" interface 2322 and connector 2324; an audio management system 2326 with associated microphone 2328, speaker 2330 and headphone jack 2332; and various optional accessory features 2338 such as a digital camera, GPS, accelerometer, etc. As further noted, the smart device 2100 may itself be a smart device 100 or the smart device 2100 may include a control device 100' as described previously. Programming may be provided and stored in memory means 2312 to control the operation of smart device 2100 by way of operating system 2340 software such as for example iOS, Android, Linux, Web apps, etc., which operating software may support voice-enabled control as sell as the download and execution of various add-on apps 2342 as necessary for a particular purpose, all as well known in the art. As noted above, a setup agent software 2344 is also provisioned to smart device 2100 in order to facilitate detection, installation, and operation of manufacturer-supplied appliance interface apps, as will now be described in further detail. It is also to be understood that, while the illustrated smart device 2100 is particularly adapted to receive input via use of a keypad and/or touchpad display that is provided as an integral part of the smart device 2100, the smart device 2100, or other like smart devices such as the TV illustrated in FIG. 2B, can be provided input via use of further remote devices such as a remotely located mouse, pointer device, touch pad, or the like. These remotely located input devices would accordingly be adapted to communicate to an associated smart device data that is indicative of user interactions with such input devices to thereby achieve the same purposes described herein, e.g., to navigate and interact with a user interface.

Figure 20:
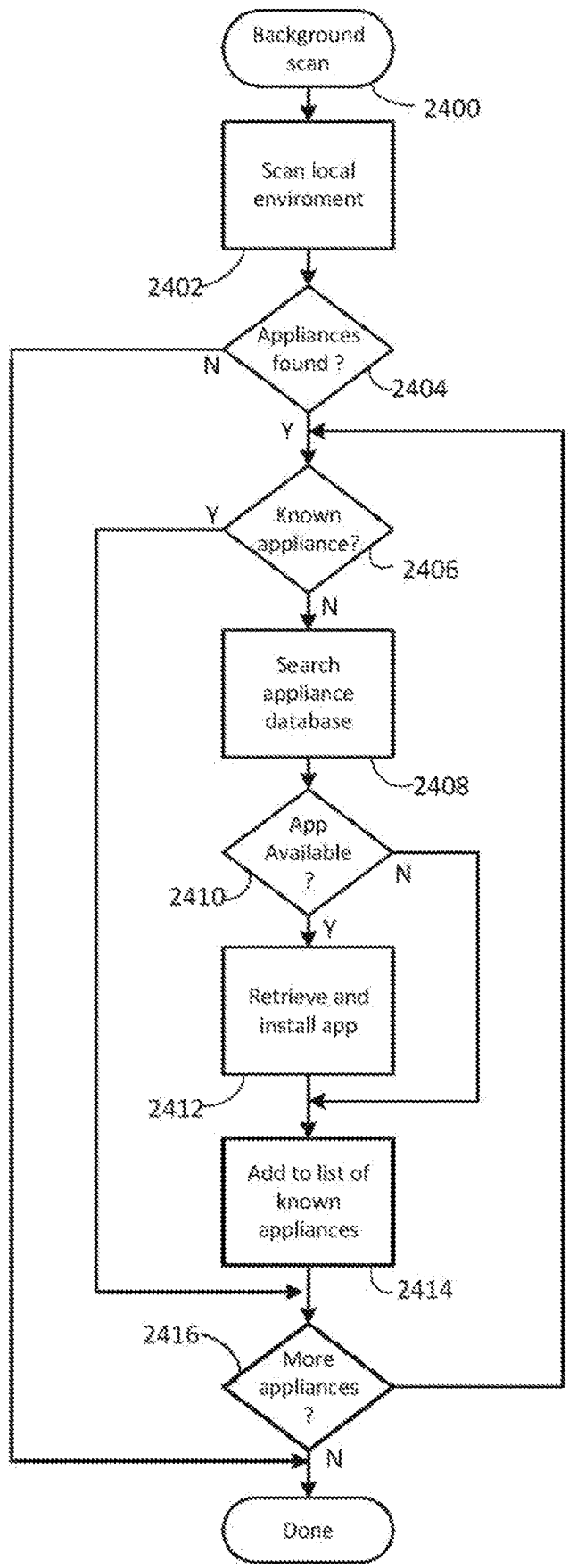
FIG. 20 illustrates in flow chart form an exemplary series of steps carried out by a smart device setup agent upon detection of a network enabled appliance in its environment.

With reference now to the flowchart of FIG. 20, at step 2400 the setup agent 2344 may periodically initiate a scan 2402 of its current wired or wireless, network environment (e.g., "WIFI," "BLUETOOTH,", etc. or any combination thereof) in order to ascertain the presence of one or more networked appliances. This action may be initiated automatically (for example based on a timer which is used to measure predetermined periods of time, in response to the device being turned on, in response to a detected change in location of the smart device using for example its GPS or the like type of functionality, etc.), or when connecting to new networks, or may be manually initiated by a user of smart device 2100 (for example in response to an activation of a user input element, in response to the smart device 2100 being moved, etc.) as appropriate for a particular embodiment. If it is determined at step 2404 that no responsive appliances are present in the environment, the setup agent actions are complete. If, however, responsive devices are detected on the wireless network, e.g., a device responds with data indicative of its identity in response to a polling request message sent from the smart device 2100, then at step 2406 the setup agent may next determine, using the information received, if a responsive appliance is already known to the setup agent, e.g., determine if the appliance has already been detected during a previous detection operation or otherwise manually indicated to the smart device 2100. Such a determination may be made, for example, by consulting a setup agent-administered listing of appliance identities, maintained as will be described hereafter at step 2414. If the appliance is already known to the setup agent, processing continues at step 2416 to determine if further responsive appliances have been detected.

If it is determined that a newly-responsive appliance has been detected, then at steps 2408 and 2410 the setup agent may next determine if an app is available for that appliance. Such a determination may be made, for example, by using vendor information, a third party compatibility database, or by a social network database which may contain related appliance information updated by other users or by searching a database that functions to cross-reference appliance identifying data as would be received from the appliances (e.g., data indicative of a manufacturer and model number) to available apps and locations from which such apps may be download. Such a database may be stored in local memory 2312 as part of the setup agent programming, may be located at a cloud based data storage facility or server 2116, or a combination thereof, as appropriate for a particular embodiment. If no app is available, processing continues at step 2414, adding the instant appliance identity to the listing of known appliance identities. If it determined that an app is available, at step 2412 the appropriate app may be recommended to the user or may be downloaded to the smart device 2100 from a location indicated in the database entry, e.g., a location pointed to by use of a URL, IP address, etc. As will be appreciated, depending on the particular implementation such a download and install may be performed automatically by the setup agent, or the agent may first present the download possibility to the user of smart device 2100 for confirmation. As will also be appreciated, in those instances where the app download is sourced from a site which requires user sign-in and/or authentication, such as for example the "iTunes" brand store or "Android Marketplace" brand store, user credentials may be pre-loaded into the setup agent program to facilitate such automatic download, or may be requested from smart device user each time download is to be performed.

When an app is downloaded and installed, in some embodiments the setup agent may register that app with a cloud based service, by way of forwarding unique identity information regarding the app and the environment (e.g., network and/or app owner information) in which it is operational to a server system such as for example the server 2116 of FIG. 17. Such registration information may be subsequently utilized for the purpose of synchronizing multiple instances of the same app across different Operating Systems, as will be further described hereafter in conjunction with FIG. 21.

In some embodiments, the setup agent may, in conjunction with the installation of certain apps which require specific equipment configurations, also generate macro command sequences as necessary to place various appliances into the required state upon initiation of the app. By way of illustration without limitation, a TV viewing or game show participation app may require that a TV 2102 to be set to a particular input and/or a cable set top box 2104 be tuned to a particular channel, etc., in which case a command sequence ("macro") may be created by the setup agent to be executed every time that app is initiated. As will be understood by those skilled in the art, a single GUI may display all of the app links and common macros across the OS's. Since methods for control of entertainment appliances and/or use of macros are well known in the art, these will not be discussed further herein, however for additional information the interested reader may turn to for example U.S. patent application Ser. No. 13/657,176 "System and Method for Optimized Appliance Control" or Ser. No. 13/071,661 "System and Method for Facilitating Appliance Control via a Smart Device", both of common ownership and both incorporated herein by reference in their entirety.

Next, at step 2414, the setup agent may add the current appliance identity into a local tabulation of known appliances. Such an identity may comprise a serial number, MAC address, or any other data value suitable to uniquely identify the appliance. Thereafter, at step 2416 the setup agent may ascertain if additional responsive appliances were detected and, if so the process described above is repeated, until all responding appliances have been accounted for.

While not illustrated, in some embodiments, provision may also be made within the setup agent programming to allow a user to purge or edit entries in the tabulation of known appliances, for example when a smart device is permanently relocated to a different environment, etc. Removal of known appliance tabulation entries may also be performed automatically by the setup agent when a previously responsive appliance has failed to acknowledge several scan cycles; when an associated app is deleted by the user of the smart device; etc.

Figure 21:
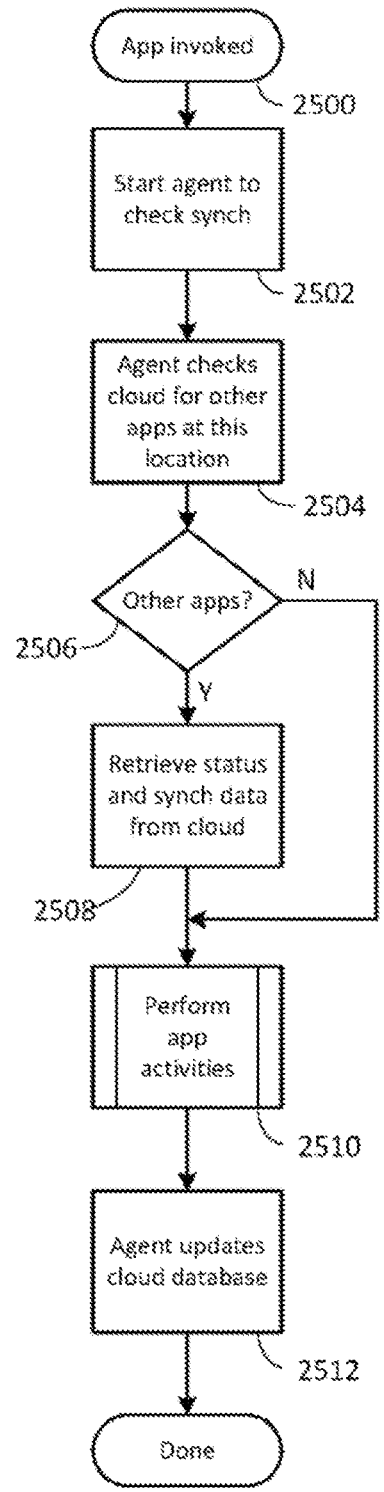
FIG. 21 illustrates in flow chart form an exemplary series of steps carried out by a smart device setup agent to synchronize status and other data across multiple instances of an appliance interface app.

With reference now to the flowchart of FIG. 21, when an individual appliance associated app, for example such as the app illustrated in FIG. 2A, is invoked at step 2500, in some embodiments the app may initially invoke a setup agent at step 2502 in order to effect synchronization of this app's appliance status values with those of any other instances of the same app which may be present in the current environment and/or resident on other devices registered to the same owner. To achieve this, at step 2504 an exemplary setup agent 2344 may access a cloud based database service, located for example on server 2116, in order to determine if any other instances of this app are present in the current environment, have common ownership, and/or the like. To accomplish such a check, the setup app may provide a unique app identity and unique environment identity to the database service. As appropriate for a particular implementation, an app identity may comprise a label value assigned by the developer(s) of the app; a manufacturer and appliance model number; or any other data which may serve to uniquely identify the specific app. An environment identity may comprise a "WIFI" network name; access point address; one or more MAC addresses; a user id; etc; or any other data which may serve to uniquely identify the specific environment in which the app is currently active. The cloud based service may compare the provided values against a database of installed app information in order to determine if other instances of the app are present in the local environment and/or to determine if a corresponding app might be newly available for use on any of smart devices within the local area network. If an app is newly available, the app can be provisioned to such devices and synchronized with existing apps within the network as described above.

At step 2506 it may be determined, based on the response from the database service, whether any other instances of this app are in fact registered at the current environment. If not, processing continues at step 2510 where control may be returned to the app for the performance of the function(s) for which it was invoked. If, however, it is determined that other instances of the instant app are present, then at step 2508 the most recently saved status of the app may be downloaded from the corresponding entry in the cloud database and used to pre-configure the current instance. Such status information may include, as required for a particular appliance and/or app, items such as control settings, progress indicators, reminders, timeouts, state switches, authentications, cookies, shopping cart contents, service information, error logs, etc., without limitation.

At step 2510 the function(s) for which the app was invoked may then be performed, after which at step 2512 updated app status data reflecting the new state of the app may be uploaded to the cloud database for storage and subsequent use by this or other instances of the app.

As described above, a voice platform enabled smart device 2100 can be used to discover an appliance and, after the appliance is discovered, a finger print for the appliance, e.g., manufacturer information, brand information, device type information, device model information, firmware version information, supported control interface information, information about a supported app running on the device, information about a supported app running on the smart device 2100 for use with the device, and/or the like information usable to uniquely identify an appliance, may be used to retrieve one or more apps (which apps may include or provide access to appropriate command data, formatting information, etc. as needed) for providing voice control capabilities to the system. Furthermore, it is contemplated that, in some instances, an appliance discovery process can be utilized as described above for the purpose of determining if an appliance supports control via a voice enabled platform, e.g., to determine if the appliance is an "ALEXA" cloud-based, voice serving platform compatible device and, in the event the smart device 2100 does not have the appropriate software for supporting that device already installed thereon, e.g., the "ALEXA" cloud-based, voice service platform software, the "SIRI" cloud-based, voice service platform supporting software, the "GOOGLE ASSISTANT" cloud-based, voice service platfoim software, the smart device 2100 may be caused to first install such software in memory whereupon execution of that software may be used to perform further device discovery for use in obtaining one or more apps (also known as a "skill," "Action," or the like as noted above) for use in connection with the voice service platform supporting software to thereby configure the smart device 2100 to communicate with that appliance. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

In a similar manner, a voice platform enabled smart device 2100 can be used to discover a service and, after the service is discovered, a finger print for the service, e.g., manufacturer information, brand information, information about an app running on the appliance, and/or the like information usable to uniquely identify a service, may be used to retrieve one or more apps (which apps may include or provide access to appropriate command data, formatting information, etc. as needed) for providing voice control capabilities to the system. Furthermore, it is contemplated that, in some instances, a service discovery process can be utilized as described above for the purpose of determining if an appliance supports a service that is controllable via a voice enabled platform, e.g., to determine if the appliance supports an "ALEXA" cloud-based voice serving platform compatible service and, in the event the smart device 2100 does not have the appropriate software for supporting that service already installed thereon, e.g., the "ALEXA" cloud-based voice service platform software, the "SIRI" cloud-based voice service platform supporting software, the "GOOGLE ASSISTANT" cloud-based voice service platform software, the smart device 2100 may be caused to first install such software in memory whereupon execution of that software may be used to perform further service discovery for use in obtaining one or more apps (also known as a "skill," "Action," or the like as noted above) for use in connection with the voice service platform supporting software to thereby configure the smart device 2100 to communicate with that service. As before, any such located operating software and/or apps may be atomically installed on a device as a part of this process or may require manual installation (in which case, the user may be notified of the software and/or apps located and prompted for installation).

Likewise, any discovery process may be performed automatically or upon manual instruction as described above.

It is further contemplated that the system may listen for and/or solicit the user to speak keywords for this same purpose. In this regard, the keywords might not only include the above noted information usable to form a fingerprint for an appliance and/or a service but might also include keywords that are known to be recognizable by a specific cloud-based, voice service platform. For example, upon the user speaking a wake work specific to a given type of digital assistant, e.g., "Alexa," "Hey Google," Hey Siri, "Hey Xfinity" or the like, the system may cause the operating software associated with that digital assistant to be provided to the smart device 2100 for installation (or may cause such operating software to be enabled if already resident of the smart device 2100) and, if needed or desired, the operating software for the voice enabled platform, once operating on the smart device 2100, can be used to perform further appliance and/or service detection processes for use in connection with configuring the smart device 2100 with apps usable to communicate with such appliance and/or services as described above.

For use in identifying the appropriate operating software and/or apps that are to be provisioned to the smart device 2100 as a part of these above-described processes, the system preferably maintains a database in which finger print information is cross-referenced to such operating software and/or apps. The database may be stored in memory of a local device and/or stored in memory associated with a server device that is accessible via a wide-area-network, e.g., stored in database associated with a cloud-computer service. In this manner, information needed to locate and download the appropriate operating software and/or apps can be deduced by a device and used to retrieve such software and/or apps from its own memory and/or memory associated with still further services, e.g., from a database associated with a third party server. It is also contemplated that any such software and/or app providing service can track owner information, e.g., log-in information, privileges, appliance(s) registered to the user, etc., to limit the ability to access and download apps, to seamlessly integrate downloaded and installed apps into the system, etc. as described above. For example, a cloud service provided for the noted purposes may function to authenticate a user when they log into the service and thereafter, using device and/or service discovery information received from one or more devices on the user's system, establish an ownership mapping between the user, the smart device, and appliances/services that will be included in the user's "connected" environment.

As will be further understood by those of skill in the art, when using an app lookup API it is feasible for the voice assistant operating on the voice enabled platform of smart device 2100 to notify a user that a new skill to a matching appliance or service that was recently added to a network, e.g., a local area network, is available for installation. The availability of a new, matching skill can be indicated to the user on the device 2100, such as by having the device 2100 display a special illumination pattern via use of LEDs, via an audible a notification, or the like. A user can then ask the voice assistant to check what the notification is about, which will lead to a skill recommendation whereupon the user can voice an acknowledgement to permit installation of the skill. The installation of the skill can be performed via use of a cloud API call using input parameters such as the user identification, smart device 2100 ID, and skill ID. Alternatively, a user may also set a policy that any matched skills are allowed to be installed automatically in which case the smart device 2100 will skip the skill recommendation and invoke the skill installation API when a new, matching skill is discovered without further user intervention.

Figure 22:
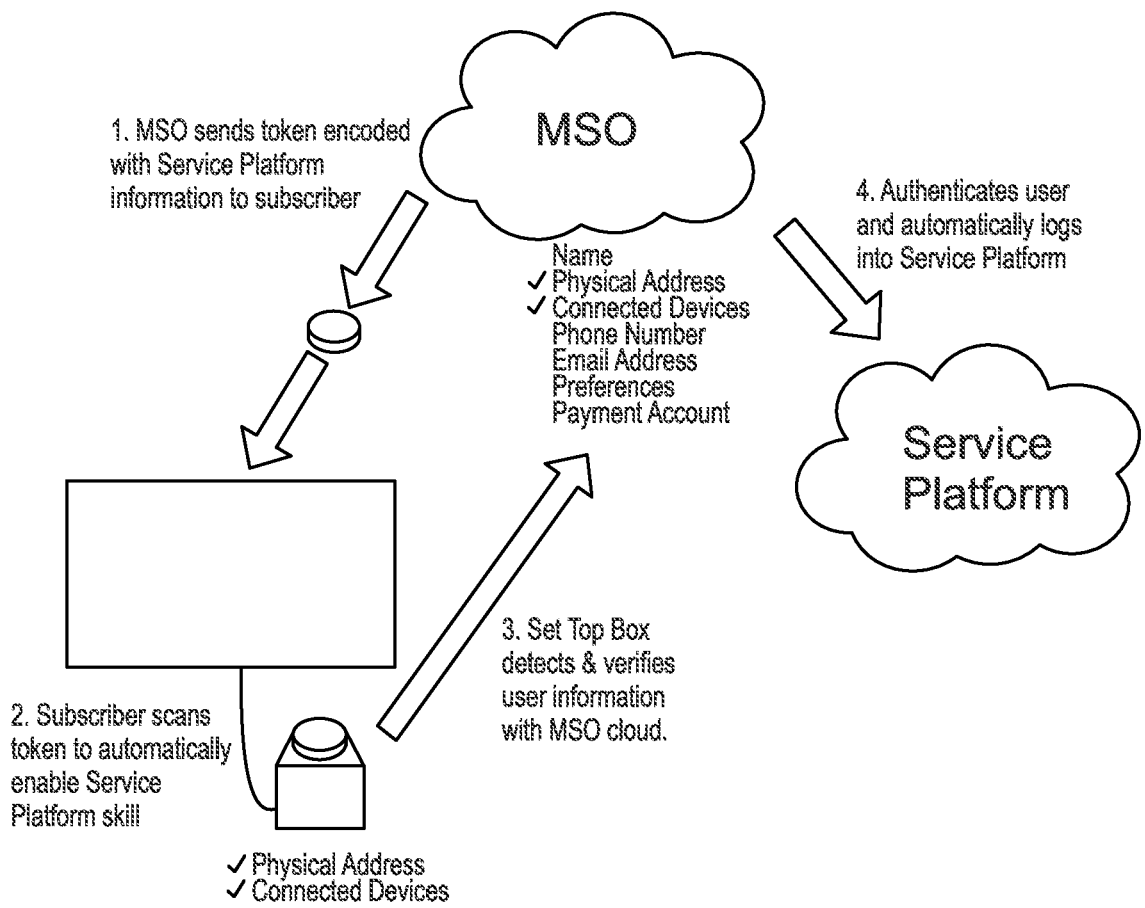
FIG. 22 illustrates a series of steps for using a token to facilitate installation of an app in a voice-enabled smart device.

In a further example, illustrated in FIG. 22, an operator of such a cloud service can leverage the noted ownership mapping to further recommend skills and/or facilitate installation of skills within the system of the user. For example, a MSO (multi-service operator) may provide an optical or RF readable token that is encoded with information that functions to identify a particular skill while the MSO database contains the user information as noted, e.g., name, home address, phone number, equipment list, email address, payment information, tv viewing history and habits, information related to a services account, such as, email address or user id, user authentication information, usage history and preferences, and/or the like, etc. As will be appreciated, some or all of this information may also be stored in database associated with one or more third party service providers.

As noted, this information can be leveraged by the MSO to send a personalized collection of tokens to its subscribers (for example electronically or via mail) and each token would be provided with data that will be usable to automatically enable a corresponding skill/app for a particular voice enabled platform on the subscriber's smart device 2100, e.g., their set-top box. By way of example, the tokens can provide data for use in installing a skill associated with a food delivery service, a ride sharing service, a review service, an e-commerce service, or the like. Upon receiving the token the user can scan, read, or otherwise obtain the data from the token—using the smart device or another device capable of forwarding such read data to the smart device—to automatically cause the associated skill to be installed on their smart device, in this example, their set-top box. Furthermore, because identifying information associated with the set-top box can be used to determine the user's home address, because the set-top box can be used to determine other connected appliances on the network of the user (as described above), and because some or all of this information can be verified to confirm the identity of the subscriber household, the system can be used to automatically log the user into an existing account with a service platform (or to create a new account with a service platform) to thereby allow such service to be quickly and easily integrated into the system. It is further contemplated that transactions between a subscriber and a service platform that would be performed via use of the voice enabled smart device, having the appropriate skill installed thereon, can then be monetized by the MSO per any agreement with the MSO and the service platform.

Figure 23:
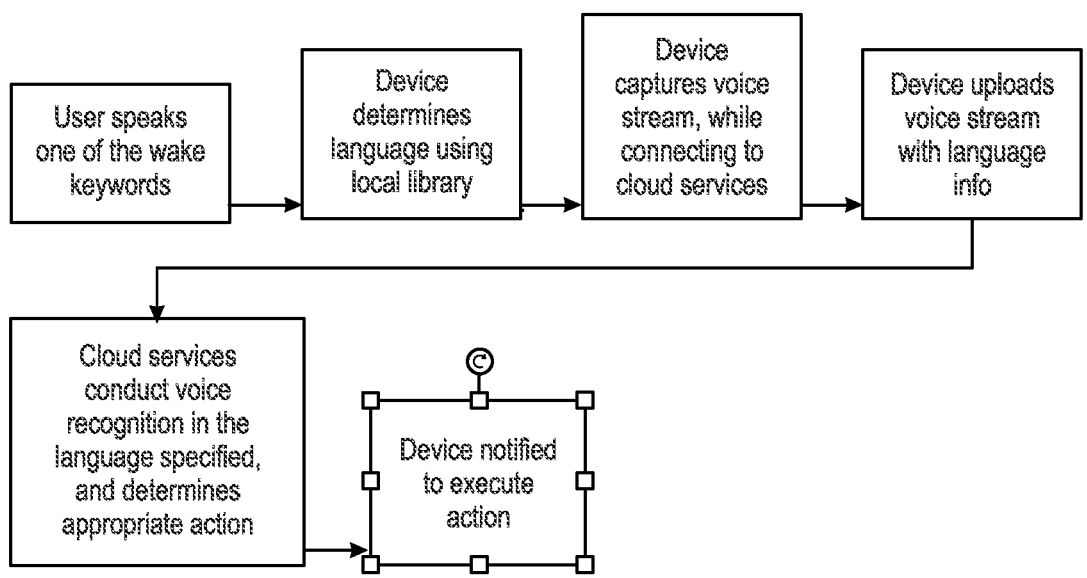
FIG. 23 illustrates a series of steps for processing voice input in a native language of a user.

In some instance, as shown in FIG. 23, it will also be desirable for a voice enable system to be adapted to recognize specific keywords, such as wake words, spoken in different languages. The recognition of these keywords, e.g., the same wake word spoken in English, Spanish, or Chinese, is preferably conducted locally on the smart device 2100 without the need for any cloud services. Once a particular keyword is detected, the voice enable device may be caused to wake to thereby capture the following voice input whereupon the following voice input would be provided to a voice processing cloud service together with information that identifies the language in which the words were spoken for further processing. It will be understood that a benefit to the user is being able to interact with the system in his/her native language with the system responding quicker to the user's commands because the voice process service will not need to recognize/detect the language in the full voice stream received from the user.

Figure 24:
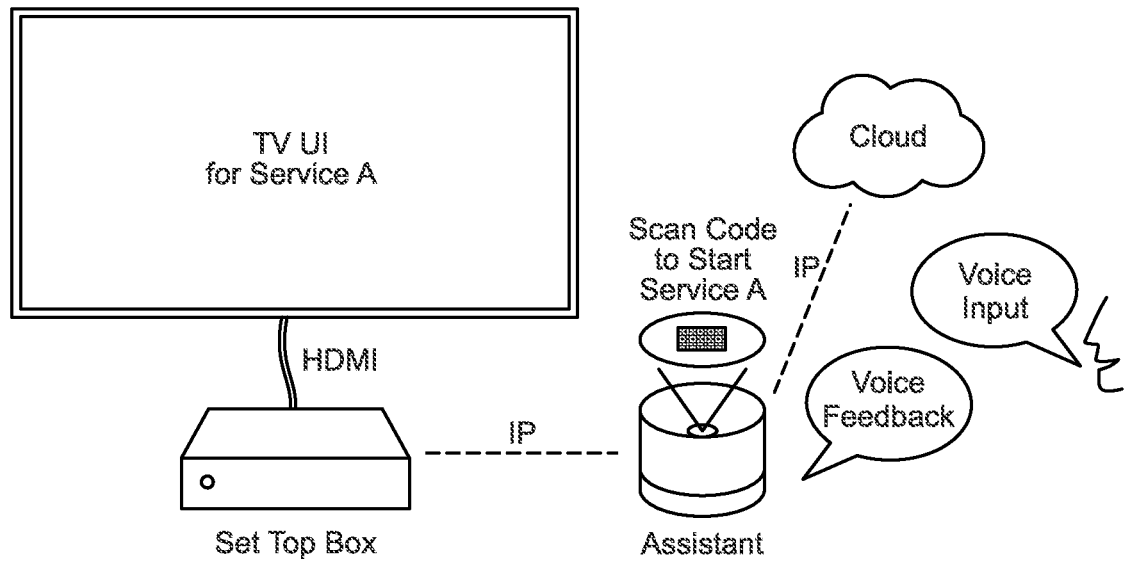
FIG. 24 illustrates an exemplary system including a voice service enabled smart device.
Figure 25:
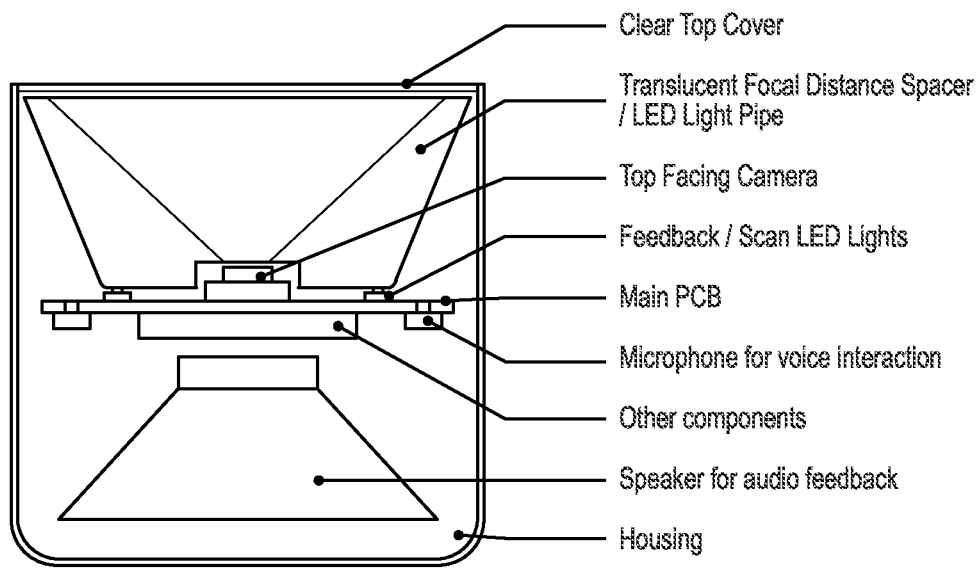
FIG. 25 illustrates exemplary components of a voice service enabled smart device.

As further illustrated in FIGS. 24 and 25, in certain instances a voice enabled smart device may additionally include a camera in addition to devices that are meant to provide feedback to a user, such as a speaker, one or more LEDs, etc. Furthermore, when such a device is coupled to a media rendering device, such as a television, whether directly or via use of an intermediate device, such as a STB, the media rendering device is also usable as a means to provide feedback to a user (and to solicit input from the user, for example by providing a voice controlled graphical user interface). Thus, using the components of the exemplary smart device as shown in FIG. 25 with the system shown in FIG. 24, a smart device can be used to scan, for example via use of an upwardly facing camera, ID barcodes, 2D QR codes or graphics, and even 3D objects. The scanning of such objects can then be used to initiate an interactive session with the user via use of the media rendering device. For example, by scanning a known object, e.g., a known QR code, that is linked to an interactive application, some or all of which may operate within the cloud, the interactive application can be invoked whereupon the interactive application will function to cause the smart device to generate a graphical user interface for display on the media rendering device and to cause the smart device to make active its microphone to receive commands from the user for interacting with the graphical user interface to perform some task, for example, to navigate to and to commence a viewing of/listening to a media.

It will be further appreciated that a device which utilizes one or more associated microphone(s), for example a universal voice assistant as described above, can additionally act as a sound meter for the surrounding environment. In the event multiple microphones are utilized, the microphones can be all on the same device or a distributed array of sensors that collect the sound and transmit the collected sounds to an aggregation node. The measurement data obtained via such sound metering can then be used for the purpose of controlling one or more functional operations of one or more target appliances.

Figure 26:
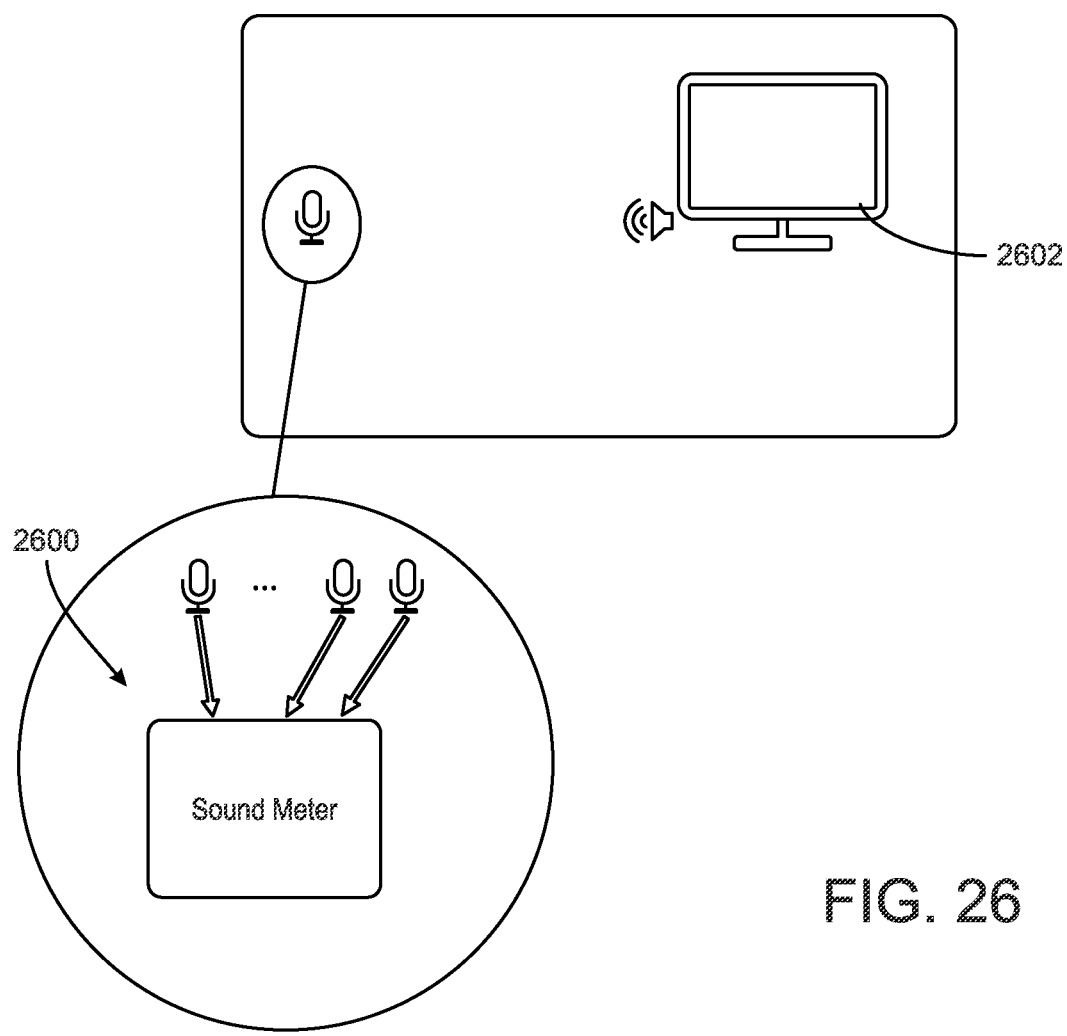
FIG. 26 illustrates an exemplary system having sound metering.

By way of example, as shown in FIG. 26, it is contemplated that a controlling device associated with the sound meter 2600 can be used to control multimedia devices 2602 in a home, hotel room, or other environment that the sound meter is used to monitor. Thus, the sound meter 2600 can be included as a component of device having control capabilities, e.g., an appliance having a universal voice controller and any required skills, or can provide sound metering related data (or command instructions as appropriate) to a device having control capabilities which data or command instructions would, in turn, be used by the controlling device to cause the controlling device to issue one or more commands for controlling such operational functions of a target controllable appliance or appliances. Thus, it is further contemplated that a system that employs the use of the sound meter can be used to control one or more entertainment system devices, for example to turn on/off a target appliance, mute/unmute a target appliance, cause an appliance to switch to a particular channel or media stream, etc.

In a preferred system, the state/context of one or more controllable, multimedia devices may be made available to the entity that labels the sounds collected by the sound meter. The state/context can be reported to/obtained by the controlling device as needed or can be derived by the controlling device from commands previously issued by the controlling device to target, controllable devices. In this manner, the system can use such state/context information to tailor the transmission of commands on an as-needed basis, e.g., if a target, controllable appliance responds to toggled power commands, the control device can avoid sending a power toggle command to the appliance for placing the appliance into an off state when it is known that the device is already in the off state. Similarly, if the sound meter is used to control of IoT devices, lighting, air-conditioning and security systems, or the like, it would also be helpful to the system to know the state of the such devices, e.g., whether the AC system is in a cooling mode, whether the security system is armed, etc.

Figure 27:
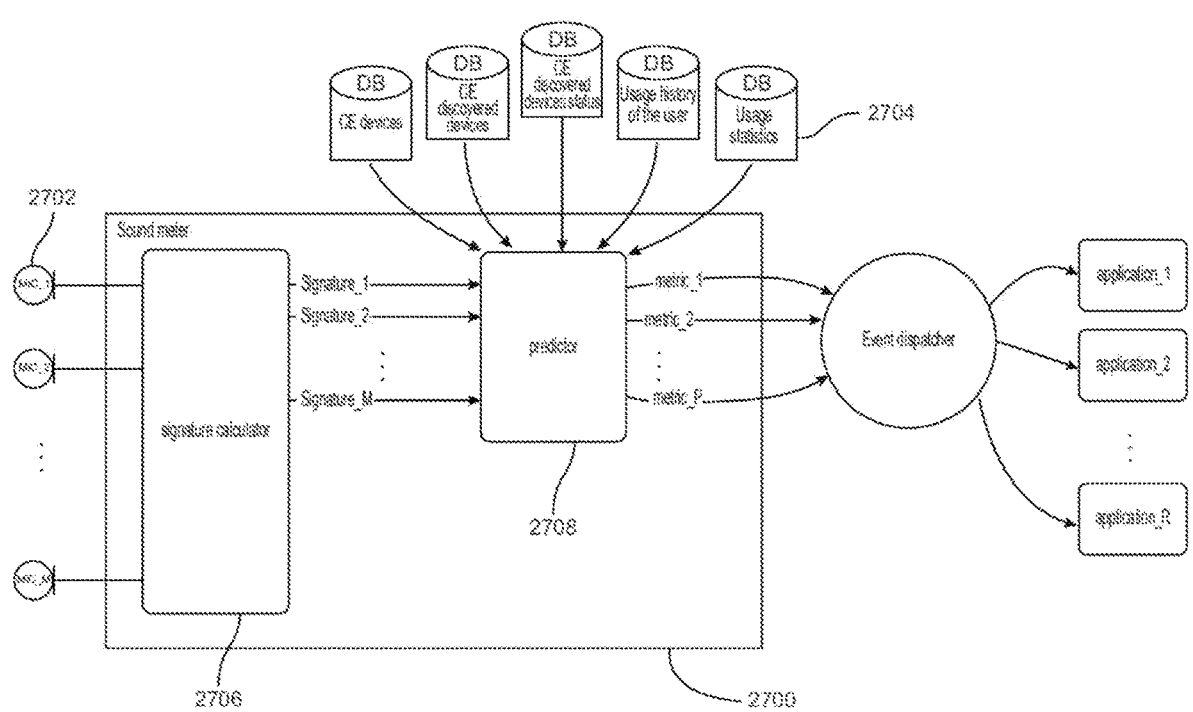
FIG. 27 illustrates exemplar components of a sound meter.
Figure 28:
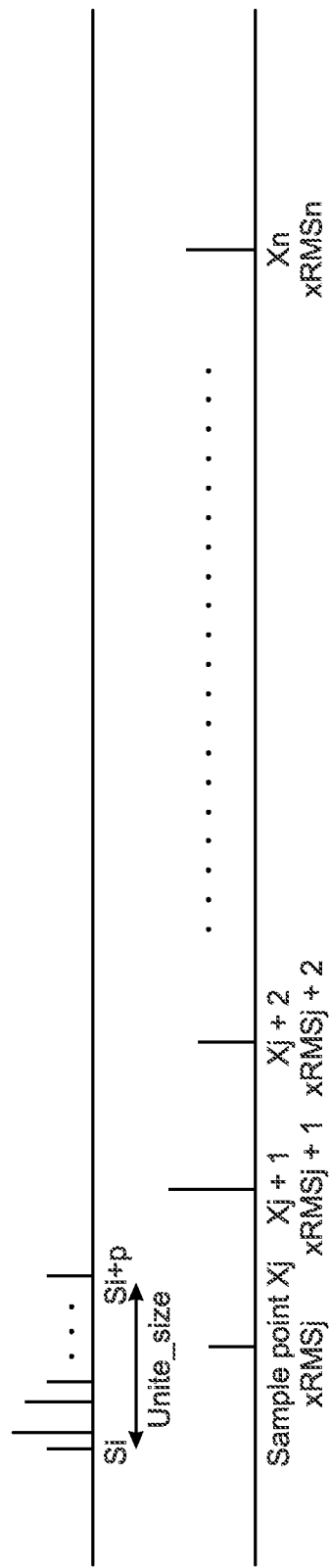
FIG. 28 illustrates an example use of an algorithm to process sample points associated with sound metering.

Turning to FIG. 27, an example sound meter 2700—which receives sound input via one or more microphones 2702—will function to determine one or more events, e.g., actions to be performed by one or more devices within an environment, based on: 1) signatures of the sound as determined by a signature calculator; and 2) prior knowledge of the environment and device status stored in local or cloud databases 2704. To this end, the sound meter 2700 includes a signature calculator 2706 and a predictor 2708 as shown in FIG. 28.

More particularly, based on the application for which the sound meter 2700 is to be used, affordability of the computation power on the platform and the cloud, and the cost sensitivity of the product, the signature calculator 2706 can use one or multiple sound signatures to categorize a sound. It is contemplated that the sound signatures will be of two main types. The first type is a time domain signature. The second type is a frequency domain signature.

In practice, the sound meter 2700 can receive the sound input data over I2S (an electrical serial bus interface standard used for connecting digital audio devices together) after DSP processing that combines sound input received via two or more microphones. The resulting sound input is preferably 16 KHz 16 bits mono PCM data (Si) and Si is aggregated over a period of Unit_size to get a sample point value of Xj as shown in FIG. 28. Different measurement algorithms can be used on the sample points {Xj}. To start, a root mean square (RMS) algorithm can be used to process the sample points vis use of a sliding rms window according to formula below:

$$(xRMSn\hat{~}2)*(n)=(xRMSn-1\hat{~}2)*(n)-X\text{first}\hat{~}2+X\text{last}\hat{~}2 \quad (1)$$

Multiple (in the illustrated FIG. 28) rms sliding windows are used to provide history data over the last window_size period of time. In this manner, when the dynamic range of the volume distribution varies less it indicates that the sound input is being generated from an electronic device as opposed to a live conversation. Examples of RMS windows used for the sound meter application are 1 second and 5 second windows. The 1 second window is used to find changes in the sound quickly. The 5 second average window is used to indicate the trend of the sound volume.

A second sound signature that may be used in connection with the sound meter is pitch contour. Pitch is a valid way to identify an individual's voice and pitch can be used for separating the sound from a television, the sound from glass breaking, etc. from an individual's voice in the household. When there are multiple sources of sound present in a sound capture, the sound capture typically does not have a distinct pitch. That is another significance of using pitching for categorizing sound based on this signature. One of the algorithms used for calculating the pitch is Average Magnitude Difference Function (AMDF).

For applications in which larger computational capacity is available, a sound signature may be calculated in the frequency domain and a spectrogram of the sound calculated over a window of time may be obtained. A spectrogram is a short-time Fourier transform as a function of time. For example, a spectrum of 0 to 8 KHz and beyond may be split into bins to compare the frequency domain signature of the sound. The ratio of energy over sub-bands may then be used for categorizing the sound.

Figure 29:
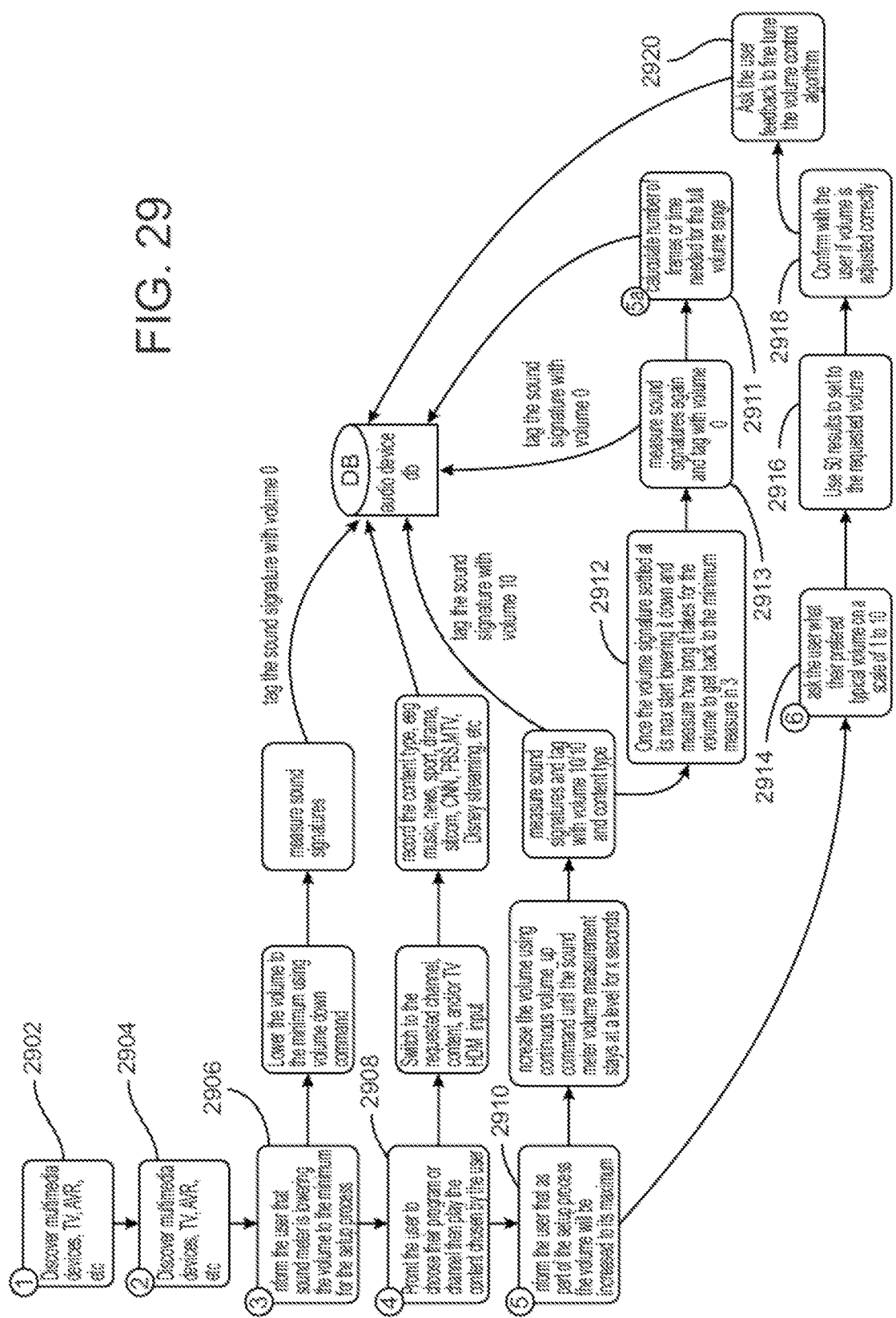
FIGS. 29-33 illustrate example method steps for configuring and using sound metering.

Turning to FIG. 29, to setup the sound metering system, it is contemplated that a setup process will be performed via use of an interactive interface between the user and the sound meter. Feedback to the user during the setup procedure could be provided by use of a voice assistance application, mobile or web application, and/or the like. During the setup process of the sound meter, the sound signatures are collected and stored in a database along with an appropriate tag. In some instances, it will also be desirable to store data indicative of the content that is being played by a multimedia device within the environment when at least some of the sound signatures are collected.

As particularly illustrated in FIG. 29, an automatic 2902 and/or manual 2904 device discovery process can be utilized to identify one or more controllable home appliances within the environment. Once a sound generating appliance has been identified (e.g., a television), the setup app may cause (or request a user to transmit via use of a controlling device, such as a remote control) one or more commands to an appropriate device (e.g., the television, a STB, or the like) to lower a volume level of the audio output being generated by the appliance to a minimum value 2906. At the minimum level, a sound signature is determined by the signature calculator as described above and the sound signature is stored in the database with an appropriate tag. Next, the setup app may prompt the user to transmit command(s) 2908 to one or more home appliances as needed to cause the appliance to be tuned to a particular channel, media stream, etc. Data associated with the accessed audio/visual content may likewise be stored in the database with an appropriate tag. The setup app may then cause (or request a user to transmit via use of a controlling device, such as a remote control) commands to raise the volume level of an audio output being generated by the audio generating appliance to a maximum value 2910. At the maximum level, a sound signature is determined as described above by the signature calculator and the sound signature is again stored in the database with an appropriate tag. After the maximum level is obtained, the system may cause (or request the user to transmit) commands to start lowering the sound level from the maximum level back to the minimum level 2912 and the system will measure the time it takes for the volume to return to the minimum level previously metered in step 2906. The number of frames or time needed to cover the full volume range may be stored in the database with an appropriate tag 2911. The sound signature for the returned to minimum level may also again be stored in the database with an appropriate tag 2913.

Having determined the signature for the maximum volume level and the minimum volume level as well as the number of frames or time needed for the full volume range, the system can ask the user what their preferred volume level is on a scale from 1 (minimum) to 10 (maximum) 2914. The system, e.g., the predictor, can then utilize a determined signature for the current volume level and the above information to set the volume level to the requested volume level 2916. During this process, the system can confirm with the user if the volume level has adjusted correctly 2918 and ask the user for feedback to tune the volume control algorithm 2920 which information may likewise be stored in the database with appropriate tags.

Figure 30:
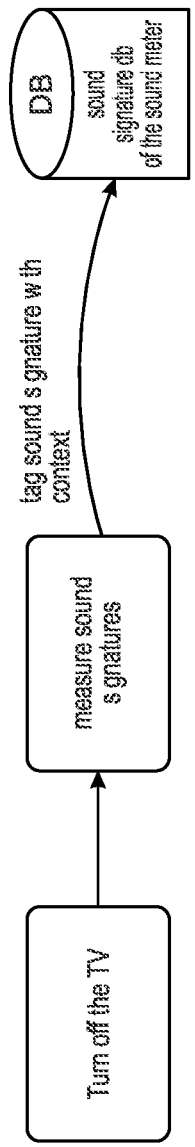
Figure 31:
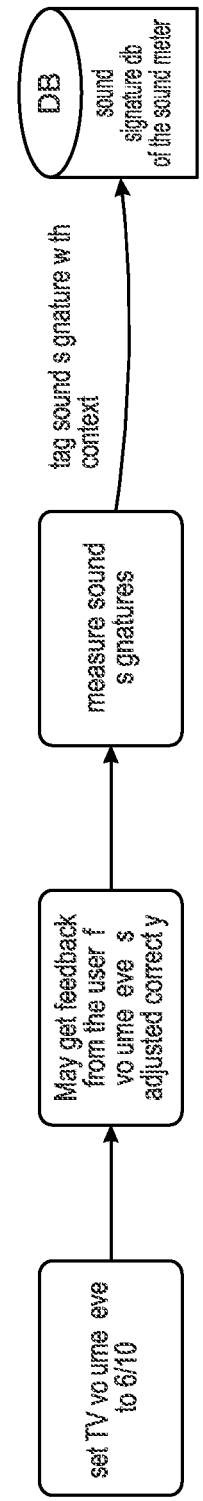
Figure 33:
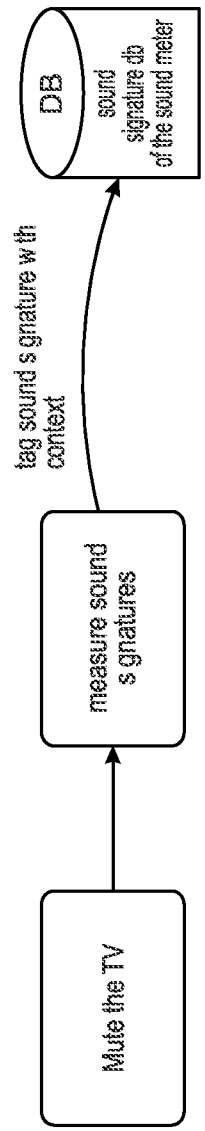

By way of further example of the steps described above, FIG. 30 illustrates the process when the user turns on the TV with the sound meter collecting training sound signatures with a "TV-on" label. When the user turns off the TV, the sound meter collects training sound signatures with "TV-off" label. As will be appreciated, the same steps may be used with play and pause operations, unmute and mute operations, etc. as shown in FIG. 33. Meanwhile, FIG. 31 illustrates the process when the user asks the system to set the volume to a certain level. For example, the user can make a request of "volume 6." The system can response to the request by generating appropriate events whereupon the sound generating device will receive appropriate volume control command(s). After setting the volume to the user's desired level, the sound meter measures the sound signature and labels the sound with the volume level of the device.

Figure 32:
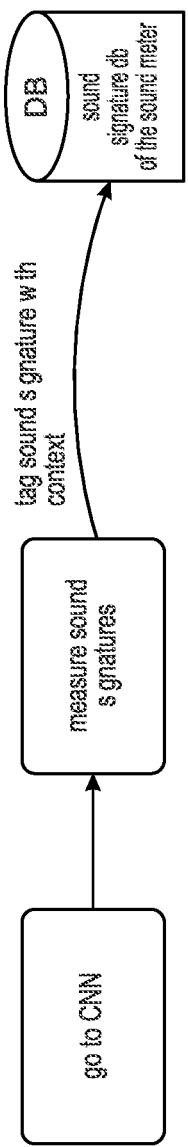

As noted previously, the system may be aware of content that is being played. As methods for obtaining channel guide data and the like are well-known in the art, such methods will not be described herein for the sake of brevity. With content awareness, the system can be used, for example, to find sport programs and generate one or more events to cause the system to tune to the channel that plays such programming. The system can be used, for example, to tune to CNN when the system has awareness of the program being broadcasted on the channel. In any instance that the system is used for playing certain content on TV or other multimedia devices that knowledge it used for collecting training signals as illustrated in FIG. 32. As will be appreciated, such context awareness may be useful as it is known that different channels, when accessed, may provide different sound levels when the sound generating device is set to a common output level (e.g., volume level 5).

It will also be appreciated that people within the environment can be talking during the capture of the training signatures. However, such environmental noise is not correlated with the TV content and repeatable features of multimedia content can be identified by use of the predictor 2708. Also, awareness of the time when the multimedia players are off can be used to provide training data of the environment sound signatures in the absence of multimedia sounds.

As concerns the predictor 2708, captured signatures may be used for predicting the state of the multimedia devices in the household. The signatures are stored into a table marked by the condition where the signatures were collected, i.e., stored with data indicative of TV/AVR status and volume. With such stored data, traditional table lookup or modern machine learning may be used in the predictor.

In use, it is contemplated that the sound meter can be employed to address at least the following three categories of applications. First, the sound meter can be used to control multimedia volume. Second, the sound meter can be used to detect a signal source, for example a TV, a person or people, a crying baby, a dog braking, broken glass, etc. Third, the sound meter can be used to adapt the performance of the sound meter and an associated voice assistant to the environment.

With respect to volume adjustment, the sound meter may be utilized to send a measurement report to the cloud and the data associated with any metered sound(s) can be used to derive the right algorithm parameters as well as collect surrounding volume levels. By applying both sound metering and measurement reporting, it is possible to do volume control such that the user can adjust the volume to a certain percentage as described above, for example the user can say "Set volume to x %". Furthermore, the system can be adapted to use a predetermined metered sound signature to do Auto/smart-mute/volume/or Pause where supported and as appropriate. It is contemplated that volume adjustment will be manifested through a skill that is specifically optimized for volume control and that such a skill could be used to control how volume control is dynamically performed with soundbars/TV.

As noted above, to derive a volume control table for the sound meter, a reference volume mapping table based on test results may be created. Due to different environments and the location of sound meter, the correspondent volume control table for the sound meter can be illustrated by the following:

$$\text{Lookup}(X) = \text{Noise} + \text{Alpha}*\text{Reference}(X) \qquad (2)$$

When it is assumed that the sound meter's location does not change frequently, Alpha is the linear factor that represents the impact of sound meter's location and X is a volume setting level. Thus, in equation (2) above, if the system is aware of Noise and X (X!=0), the system can derive the specific volume control table for the sound meter. In this case, the system can support a use case of "Set volume to Y %".

To obtain the sweeping time to sound level function, it is assumed that, for each model of TV (or any sound source), the function between sweeping time and sound level is fixed. Thus, by sweeping the volume down from a sound level (X) to the minimum value (0) and by recording the time it took to get from sound level (X) to sound level (0) the value sweep (X) can be defined. The value sweep (X) can then be used in a calibration process. For example, the system can sweep the volume down to sound level (0) and get sound meter readings along the sweep, starting from the point that is believed to correspond to sound level (0). The system can then trace backwards for Sweep(X) to find the matching sound level X of the sound source device.

It will also be understood that, based on the reported sound meter measurement and corresponding activity command, the system can derive a background noise level. For example, when a sound generating device is commanded to turn off, the system can request a sound meter measurement report after say 10 seconds to get a sense on the background noise reading, when the sound generating device is commanded to turn on, the system can request a sound meter measurement report right away, to collect a background noise reading, and when the sound generating device is commanded to enter a muted stated, this state can also be a good reference to collect background noise. However, because people may also be talking in the background when a mute command is issued in the normal course of system operation, one way to give an estimation is to use the minimal RMS sample value. It is also to be noted that a Mute step can be added to the setup process to collect a rough estimation of the background noise as the starting point. Finally, assuming there are appliances or HVAC generated sounds in the environment, the background noise pattern can be established based on long term periodical sample collection.

In some cases, the noise level is estimated with a confidence level associated with it. As data sampling comes in, the system can refresh the confidence level and the estimated noise level so that necessary adjustment will be done to adjust the lookup table.

It is also contemplated that a DSP algorithm can be used to suppress noise from the surrounding environment based on different inputs from different microphones within the device. In one case, the DSP algorithm can learn the direction of media sound during the setup phase and can then use a beam forming algorithm to filter out the noise that comes from a different direction. In another case, the DSP algorithm may also determine and take into consideration where a user stands so as not to filter out the sound, e.g., voice commands, originating from that direction. In yet another case, the DSP algorithm will calculate RMS from the direction of the media sound and indicate that to the host periodically.

To determine the volume setting level, the system retrieve the current volume setting levels via use of IP interface when supported by a sound generating device. The system may also set volume levels via an IP interface and use that setting (with feedback via sound metering) as the reference. For example, every time a user turns on the TV, the system can set the default volume level to be 30%.

For those devices that do not support this form of control interface, a calibration process would be needed during the setup. As discussed previously, one example of a calibration process functions by lowering the volume to its minimal value via continuous IR command transmissions (i.e., via a sweep) and the sound metered stream is reported for the process. The algorithm reading will stay at a low reading as the minimal volume is reached. That can be used as a reference sound level 0, then when the system uses Sweep (10) to trace back the sound meter measurement for sound level 10, with that reading of Lookup(10), we can find:

$$\text{Alpha} = (\text{Lookup}(10) - \text{Noise})/\text{Reference}(10) \qquad (3)$$

With Alpha and Noise being known, the system now can find Lookup(X). It is to be noted that, in the set volume command, a target RMS value is given. As the RMS value updates with IR commands being sent out, the targeted RMS value should be adjusted based on the ramping up of the volume. Thus, in some circumstances, the ramping up curve of a specific brand and/or model of a sound generating device can be tested and stored as a reference. It should also be noted that such a calibration process may take several seconds because the system will not know how long it takes the continuous IR command transmissions to drive down the volume to 0.

In use, it will be further appreciated that using a DSP algorithm to suppress the noise may also affects the result, e.g., while an algorithm can help filter out background music, so a volume control algorithm can deal with a human voice more accurately, it has limitations when used with over music channels, such as MTV, etc. Furthermore, when a user speaks a command, e.g., asks for volume adjustment, the utterance may also impact the sound meter reading, and, for this reason, the reported sound meter stream may be programmed to skip the user utterance period. However, in some use cases, a user utterance needs to be considered, such as when the system includes FA/FR enhancement. Yet further, because conversations between people occurring in the background will have a direct impact on the accuracy, the system may need to see if the sound input can be averaged out on a longer window in the RMS calculation.

Turing now to an example in which the system is to be used to provide a desired output setting, e.g., when a user requests the system to "Set Volume to 30%," the system may first determine what content the user is currently watching, e.g., the system knows that the user is watching "CNN" on a known model of a "LG" branded TV through the "DISH"

branded network. With the reference volume mapping table having been derived with the following information:
1. Reference(X), a table with 100 points of value that matches sound level 1 to 100 in lab test;
2. Sweep(X), a table with 100 point that records how long it takes in the sweep down process to drive sound level from X to 0;
3. Best RMS window size=10 seconds, assume Rms1 in the device twin uses 10000 as the Window_size; and
4. Unit_size=10 ms the calibration process is triggered with CNN as the content background. Through the calibration process, Alpha is derived and stored.

The system will then track if the sound resource is playing and update the current background noise level based on the reported sound meter measurement. The system will track the background noise level for Rms1 to Rms4. In the example, the noise reading is Rms1. The current volume level will then be determined using the following formula:

$$X=\text{Find}((\text{Rms1\_Average}-\text{Noise})/\text{Alpha}),\text{Reference}) \quad (4)$$

Based on the Rms1 readings out of the sound meter reporting during a WakewordPiggyback event, the system can use the average value of the last reported sound meter stream to derive the Rms1_Average above. In this example, there are 2 seconds of sound meter measurement for Rms1 and the system will use the mean of the Rms1 as Rms1_Average. Based on the calculated X value, the system can determine which direction to go from X to 30% as requested by the user in this example. More particularly, since the system has the lookup function for the sound meter, the triggering point equals lookup (X):

$$\text{TriggerPoint}(30)=\text{Lookup}(30) \quad (5)$$

It is still further contemplated that the system may provide Audio ducking, i.e., an application of the sound metering feature that allows sound meter to mute, pause, or lower the volume of AV devices that it controls when a wake-up word is detected. As will be appreciated, this functionality helps the system to get better RAR (Right Acceptance Rate) on user utterances. After the processing on the user utterance is done, the sound meter will preferably unmute, resume, or otherwise restore the volume of the controlled one or more AV devices.

For tuning purposes, it is yet further contemplated that the system may function to adjust the microphone gain after DSP. By getting the sound meter measurement, the system can derive the environment and set the gain to an optimized value based on the environment. Likewise, by using sound metering, the system can FA/FR test by collecting sound meter readings to check if there is any hardware discrepancies in the sound metering hardware (e.g., between a test device used to establish any table information and a usage device).

While various concepts have been described in detail, it will be appreciated by those skilled in the art that various modifications and alternatives to those concepts could be developed in light of the overall teachings of the disclosure. For example, in an alternate embodiment of control device functionality, in place of a preferred command matrix such as illustrated in FIG. 7, the programming of an exemplary device may utilize a command prioritization list, for example a prioritization list "IP, CEC, IR" may cause the device programming to first determine if the requested command can be issued using Internet Protocol, only if not, then determine if the requested command can be issued using a CEC command over the "HDMI" interface, and only if not, then attempt to issue the requested command via an infrared signal. Such a prioritization reflects an exemplary preference of using bi-directional communication protocols over uni-directional communication protocols over line of sight communication protocols, e.g., IR, when supported by the intended target appliance. Furthermore, while the examples above may describe a setup agent resident in a smart device, such as a phone or tablet, it will be appreciated that the teachings herein may be equally applicable to other app-capable device such as for example without limitation "smart" TVs, cable or satellite set top boxes, streaming video devices, home automation systems, and the like. Still further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer readable media having stored thereon instructions executable by a processing device associated with a sound metering device, the instructions, when executed by the processing device, causing the sound metering device to perform steps, comprising:
while at least one controllable device is operating in a one of a plurality of operating states within an environment, calculating a signature for a first sound captured within the environment via use of a one or more microphones associated with the sound metering device;
causing the calculated signature for the first sound to be stored in a data repository in association with the one of the plurality of operating states of the at least one controllable device;
responding to an input that is received by the sound metering device and that is associated with a desired state of the at least one controllable appliance by using the input and the calculated signature for the first sound as retrieved from the data repository to predict an event to dispatch to a controlling application adapted to cause commands for controlling corresponding functional operations of the at least one controllable appliance to be communicated to the at least one controllable appliance;
dispatching the predicted event to the controlling application whereupon the controlling application will use the dispatched, predicted event to cause one or more commands to be communicated to the at least one controllable appliance to thereby place the at least one controllable appliance into the desired state.

2. The computer-readable media as recited in claim 1, wherein the controlling application and the sound metering device are component parts of a controlling device.

3. The computer-readable media as recited in claim 1, wherein the controlling application comprises a skill associated with the at least one controllable appliance installed on a device in communication with the sound metering device.

4. The computer-readable media as recited in claim 1, wherein the at least one controllable appliance comprises a component of at least one of a heating system and a cooling system.

5. The computer-readable media as recited in claim 1, wherein the at least one controllable appliance comprises a component of a home security system.

6. The computer-readable media as recited in claim 1, wherein the at least one controllable appliance comprises a component of an audio/visual entertainment system.

7. The computer-readable media as recited in claim 1, wherein the input comprises a voice command received via the one or more microphones.

8. The computer-readable media as recited in claim 1, wherein the desired state of the at least one controllable appliance comprises a volume state.

9. The computer-readable media as recited in claim 1, wherein the instructions cause the sound meter to suppress background noise when calculating the signature for the first sound captured within the environment.

10. The computer-readable media as recited in claim 1, wherein the instructions cause the sound meter to use a direction associated with first sound when calculating the signature for the first sound captured within the environment.

11. The computer-readable media as recited in claim 1, wherein the instructions cause the sound meter to calculate a signature for a second sound captured within the environment via use of the one or more microphones associated with the sound metering device, cause the calculated signature for the second sound to be stored in the data repository, and respond to the input by using the input, the calculated signature for the second sound as retrieved from the data repository, and the calculated signature for the first sound as retrieved from the data repository to predict the event to dispatch to the controlling application.

12. The computer-readable media as recited in claim 11, wherein the first sound comprises a sound captured while an audio generating appliance within the environment is operating at a minimal volume level and the second sound comprises a further sound captured while the audio generating appliance within the environment is operating at a maximum volume level.

13. The computer-readable media as recited in claim 1, wherein the instructions cause the sound meter to respond to the input by using the input, a current state of the at least one controllable appliance, and the calculated signature for the first sound as retrieved from the data repository to predict the event to dispatch to the controlling application.

14. The computer-readable media as recited in claim 13, wherein the instructions cause the sound meter to use input received via use of the one or more microphones to determine the current state of the at least one controllable appliance.

15. The computer-readable media as recited in claim 1, wherein the desired state comprises a media access state for the at least one controllable appliance.

16. The computer-readable media as recited in claim 15, wherein the media access state comprises a channel tuning state for the at least one controllable appliance and wherein the first sound captured within the environment comprises a sound being output by the at least one controllable appliance while in the channel tuning state.

17. The computer-readable media as recited in claim 12, wherein the instructions cause the sound metering device to determine an amount of time required to transition the audio generating appliance from the maximum volume level to the minimal volume level and wherein the input, the determined amount of time, and the calculated signature for the first sound as retrieved from the data repository is used to predict the event to be dispatched to the controlling application.

* * * * *